United States Patent
Sawada

(10) Patent No.: US 11,825,052 B2
(45) Date of Patent: Nov. 21, 2023

(54) IMAGE FORMING APPARATUS

(71) Applicant: CANON KABUSHIKI KAISHA, Tokyo (JP)

(72) Inventor: Hirohisa Sawada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/975,895

(22) Filed: Oct. 28, 2022

(65) Prior Publication Data

US 2023/0179724 A1 Jun. 8, 2023

(30) Foreign Application Priority Data

Dec. 2, 2021 (JP) ................................. 2021-195902

(51) Int. Cl.
*H04N 1/00* (2006.01)
*H04N 1/23* (2006.01)
*G03G 15/00* (2006.01)

(52) U.S. Cl.
CPC ..... *H04N 1/00907* (2013.01); *H04N 1/00408* (2013.01); *H04N 1/2315* (2013.01); *G03G 15/50* (2013.01); *G03G 15/5016* (2013.01)

(58) Field of Classification Search
None
See application file for complete search history.

(56) References Cited

U.S. PATENT DOCUMENTS

| | | | | |
|---|---|---|---|---|
| 5,454,067 | A * | 9/1995 | Tsai | G06F 3/1284 358/1.6 |
| 8,482,556 | B2 * | 7/2013 | Meunier | H04N 1/00496 358/1.18 |
| 2014/0009784 | A1 * | 1/2014 | Nara | H04N 1/00137 358/1.15 |
| 2016/0085200 | A1 * | 3/2016 | Fujita | G03G 15/80 399/90 |
| 2017/0115614 | A1 * | 4/2017 | Yuzawa | G03G 21/1657 |
| 2018/0077307 | A1 * | 3/2018 | Sawada | H04N 1/00384 |
| 2021/0360114 | A1 * | 11/2021 | Toda | G03G 21/16 |
| 2022/0244668 | A1 * | 8/2022 | Yoshino | G03G 15/5016 |
| 2022/0279078 | A1 * | 9/2022 | Makino | G03G 15/50 |

FOREIGN PATENT DOCUMENTS

JP 2010243977 A 10/2010

* cited by examiner

*Primary Examiner* — Miya J Cato
(74) *Attorney, Agent, or Firm* — ROSSI, KIMMS & McDOWELL LLP

(57) ABSTRACT

Disclosed is an image forming apparatus which includes: a frame with an image forming portion; an operation unit being arranged to be movable with respect to a top surface of the frame; a cable with an electric wire which connects the frame and the operation unit; and an outlet provided on the frame or the operation unit, wherein the cable includes: an elastic member provided along the electric wire from the frame to the operation unit, the elastic member having a width equal to or greater than a diameter of the electric wire; and a protruding portion with elasticity, provided on a side of the elastic member on which the electric wire is arranged such that the protruding portion protrudes from the side of the elastic member, the protruding portion having a height which is equal to or greater than the diameter of the wire.

20 Claims, 19 Drawing Sheets

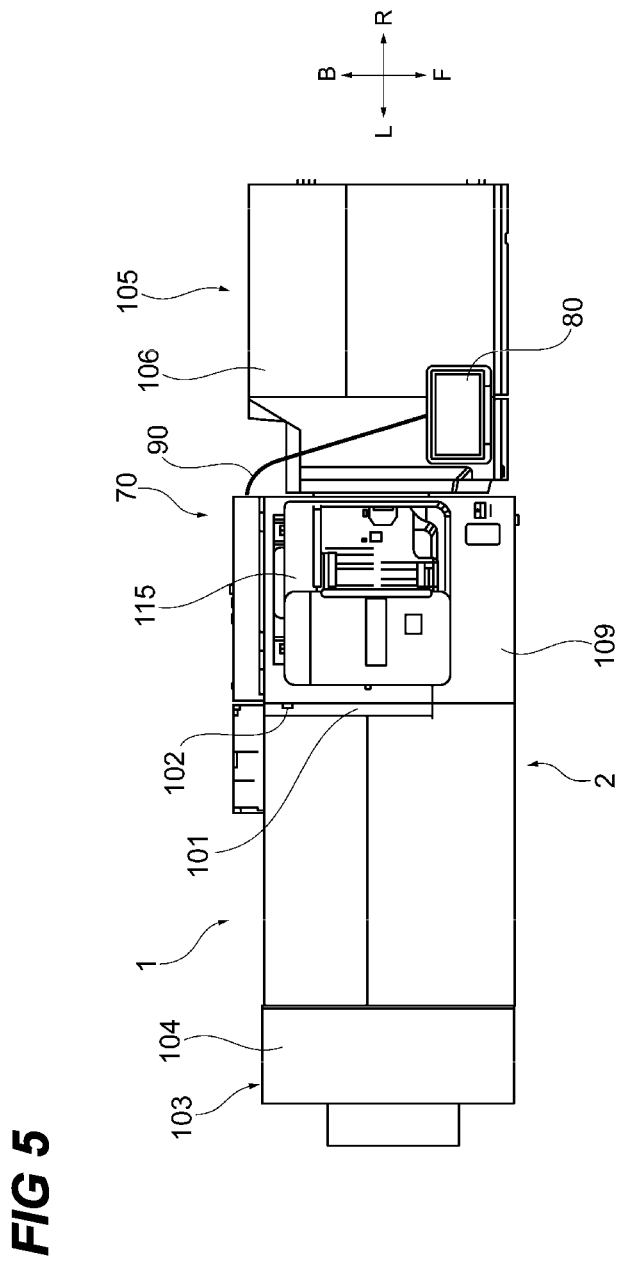

IMAGE FORMING APPARATUS

BACKGROUND OF THE INVENTION

Field of the Invention

This invention relates to an image forming apparatus that includes an operational unit and forms an image on a sheet.

Description of the Related Art

An image forming apparatus such as a copying machine has an operation unit for a user to switch operations and to make detailed settings in each operation. In an image forming system in which optional devices such as a feeding unit, a conveying unit and a post-processing unit are connected to the image forming apparatus, a user also performs tasks such as setting various these optional devices using the operation unit.

When a large imaging forming system in which multiple optional devices are connected together so that the overall length of the imaging forming system becomes large, a user may perform tasks on the optional devices at a distant position from the image forming system on which the operation unit is provided. When such tasks are performed frequently, it is not efficient for the user to return to the image forming apparatus to operate the operation unit.

In view of this, Japanese Patent Application Laid-Open No. 2010-243977 proposes a system in which an operation unit is installed not only on the image forming apparatus but also on an optional device. The operation unit disclosed in this publication has a display for displaying information to a user, an arm for supporting the display and a support base for supporting the display with the arm. The display is supported by the arm extending from the support stand and is placed at a predetermined angle to the top surface (mounting surface) of the image forming apparatus on which the support stand is placed.

The operation unit is connected to the image forming apparatus by a cable and is movably provided at a location on the top surface of the image forming apparatus where a user can easily operate it within the range of the cable length. Moreover, the cable is configured to bend when the operation unit is moved so that the operation force when a user moves the operation unit is not impaired.

The cable for connecting the image forming apparatus and the operation unit includes electric wires for transmitting an electric signal from the image forming apparatus to the operation unit. The image forming apparatus and the operation unit are each provided with an outlet for leading the cable from the inside to the outside. When a user moves the operation unit, the cable is pressed against the end portion of the operation unit or the end portion of the image forming apparatus, which are parts of the outlets. In this case, there is a risk that the load is concentrated locally so that the sheath of the cable may be damaged or the electric wire inside the cable may be disconnected.

SUMMARY OF THE INVENTION

A representative configuration of the present invention is an image forming apparatus comprising:
a frame on which an image forming portion which forms an image on a sheet is provided;
an operation unit which receives an operation and which has a display panel which displays information, the operation unit being provided separately from the frame, the operation unit being arranged to be movable with respect to a top surface of the frame;
a cable with an electric wire which connects the frame and the operation unit to send an electric signal between the frame and the operation unit; and
an outlet provided on the frame or the operation unit, the cable leading from an inside to an outside through the outlet,
wherein the cable includes:
an elastic member with elasticity provided along the electric wire from the frame to the operation unit, the elastic member having a width which is equal to or greater than a diameter of the electric wire in a first direction; and
a protruding portion with elasticity, provided on a side of the elastic member on which the electric wire is arranged such that the protruding portion protrudes from the side of the elastic member, the protruding portion being provided along the electric wire from the inside to the outside through the outlet, the protruding portion having a height which is equal to or greater than the diameter of the wire in a second direction crossing the first direction.

Further features of the present invention will become apparent from the following description of exemplary embodiments with reference to the attached drawings.

BRIEF DESCRIPTION OF THE DRAWINGS

FIG. 5 is a diagram showing the image forming system in a case where the operation unit is arranged at a right side of the reading device on the top surface of the frame.

DESCRIPTION OF THE EMBODIMENTS

Hereinafter, embodiments of the present invention will be exemplarily described in detail with reference to the drawings. The dimensions, materials, shapes, and relative positions of components described in the following embodiments should be appropriately changed according to the configuration of the apparatus to which the present invention is applied and various conditions and are not intended to limit the scope of the present invention only to them unless otherwise specified.

First Embodiment

Figure 1:
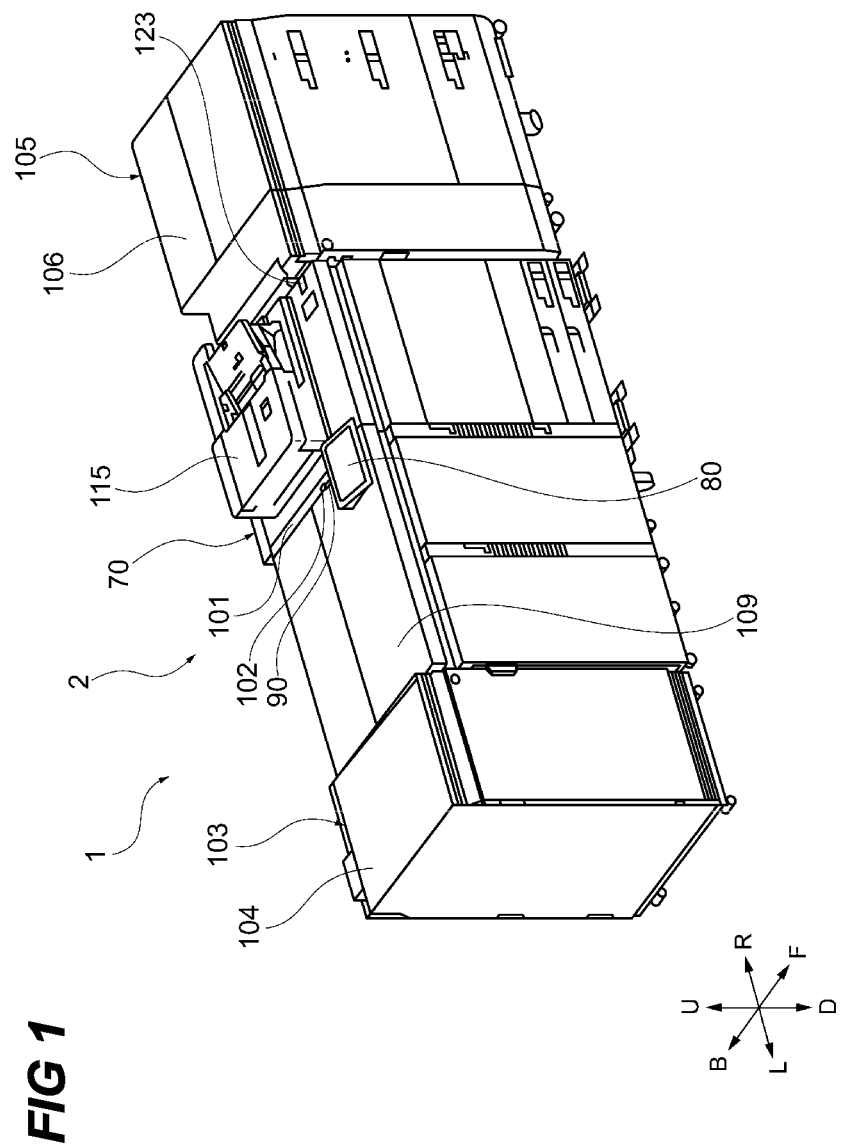
FIG. 1 is a schematic diagram showing a perspective view of an image forming system.
Figure 2:
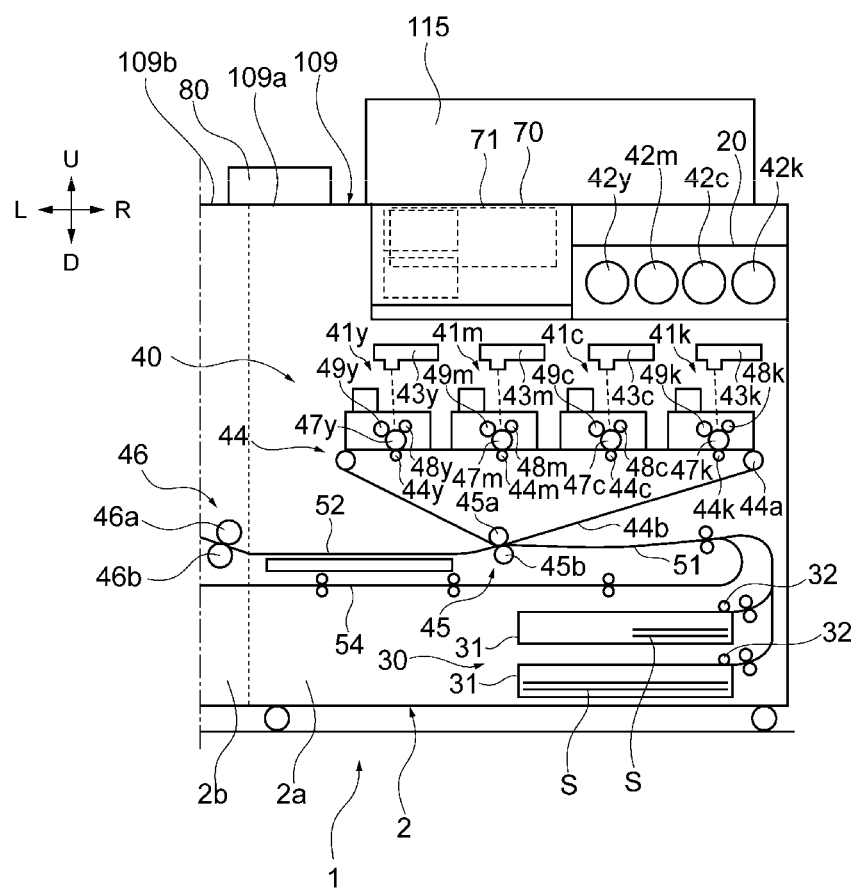
FIG. 2 is a schematic diagram showing a cross-sectional view of the image forming system.
Figure 4:
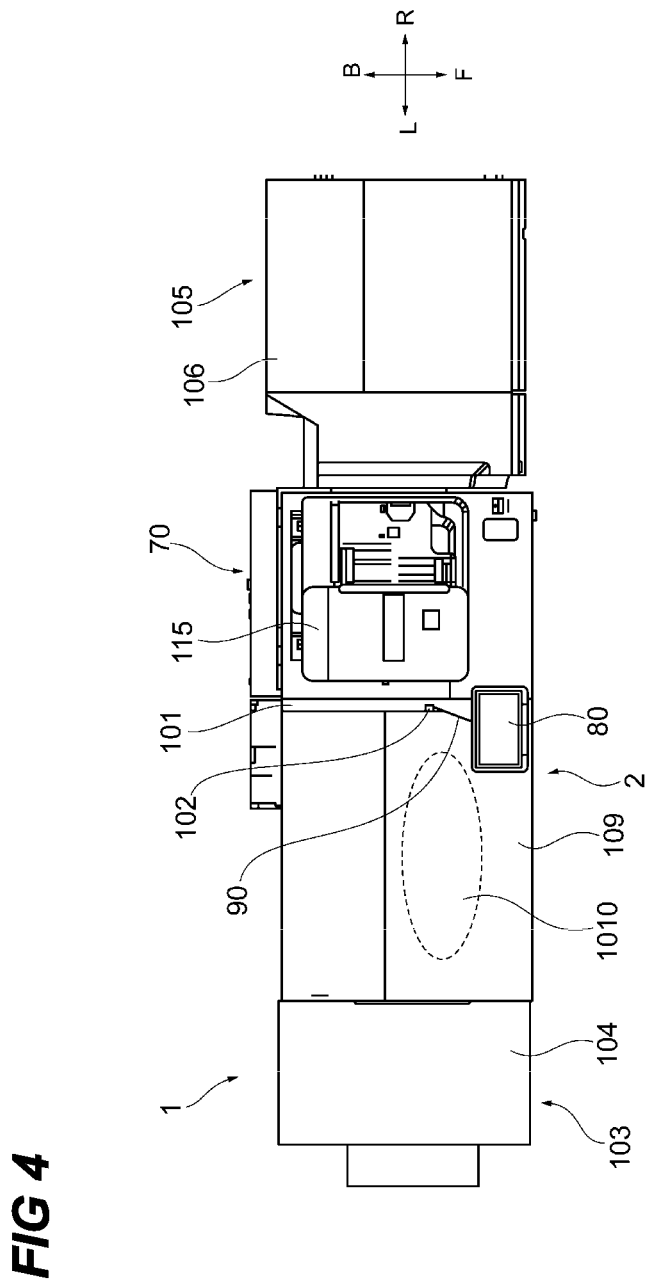
FIG. 4 is a diagram showing the image forming system in a case where the operation unit is arranged at a left side of a reading device on a top surface of the frame.

The image forming system 1 according to this embodiment will be described with reference to FIG. 1. As shown in FIG. 1, the direction toward the front side from the image forming apparatus 2 is defined as the forward direction F, and the direction toward the back side from the image forming apparatus is defined as the backward direction B. The direction from the image forming apparatus 2 toward the left side where the post-processing device 103 is located is defined as the left direction L, and the direction from the image forming apparatus 2 toward the right side where the feeding device 105 is located is defined as the right direction R. The left and right directions defined here are respectively orthogonal to the forward and backward directions. Furthermore, the vertically upward direction perpendicular to the forward and backward directions and the left and right directions defined here is defined as the upward direction U and the vertically downward direction perpendicular to the forward and backward directions and the left and right directions defined here is defined as the downward direction D. These forward, backward, right, left, upward, and downward directions are also shown in FIGS. 2, 4 and 5.

(Configuration of Image Forming Apparatus)

As shown in FIG. 1, the image forming system 1 in this embodiment includes the image forming apparatus 2, which is a printer, for example, and the post-processing device 103, which is located adjacent to the left direction L side of the image forming apparatus 2 and may stack a sheet S on which an image has been formed. In this embodiment, the image forming apparatus 2 and the post-processing device 103 are also defined as the frame. The top of the image forming apparatus 2 has the top surface 109 that can be used as a work space. In this embodiment, the top surface 109 is wider than the maximum size of the sheet S on which this image forming apparatus 2 can form an image. A user spreads out a drawing on the top surface 109 to perform drafting and other tasks. Therefore, assuming that the floor on which the image forming system 1 is installed is horizontal, the top surface 109 is also configured to be horizontal. Additionally, the top surface 109 is configured as flat as possible. The area indicated by the reference numeral 1010 in FIG. 4 is an example of a work space. If the image forming system 1 is installed horizontally, the work space 1010 will also be horizontal. This area is a part of the top surface 109 and is therefore a flat surface. The term "flat surface" refers to a surface configured such that grooves and other irregularities are minimized except for connection points between components which are unavoidable due to the configuration of the exterior of the image forming system 1. It is sufficient for the work space 1010 to have a flat-surface area enough to spread out an A3 size paper. The top surface 109 is made from a resin plate, for example, and is understood to be a "flat surface" even if it has some degree of rattling or undulation that is unavoidable in manufacturing. Further, the term "horizontal" as used here does not mean horizontal in the strict mathematical sense, but is a concept that includes horizontal to the extent that it can be regarded as horizontal in practice, that is, substantially horizontal.

In this embodiment, a tandem-type full-color printer is described as an example of an image forming apparatus 2. However, the invention is not limited to the image forming apparatus 2 of the tandem-type, but may be an image forming apparatus of another system. Further the invention is not limited to a full color imaging, but may also be monochrome imaging.

As shown in FIG. 2, in this embodiment, the image forming apparatus 2 as an example of a frame can be divided into two parts: the image forming portion frame 2a and the conveying portion frame 2b. The conveying portion frame 2b conveys the recording material formed in the image forming portion frame 2a toward the post-processing device 103. Each of the image forming portion frame 2a and the conveying portion frame 2b is also an example of a frame. The image forming portion frame 2a has the top surface 109a, and the conveying portion frame 2b has the top surface 109b. The image forming portion frame 2a and the conveying portion frame 2b can be connected, and the top surface 109a and the top surface 109b are also connected to form one flat top surface 109. Since the image forming portion frame 2a and the conveying portion frame 2b can be connected and separated, when transporting to a higher floor of a building, for example, they can be placed on an elevator and transported to a specified floor while separated. In this way, even a long and large image forming system 1 can be easily transported to a predetermined floor in a building using an elevator or other means.

The image forming system 1 has the toner supply unit 20, the sheet feeding portion 30, the image forming portion 40, the sheet conveying portion 50, the sheet discharging portion 60, the electrical unit 70, and the operation unit 80. The sheet S as a recording material is the material on which the toner image is formed. Examples of such sheet S include plain paper, a synthetic resin sheet that is a substitute for plain paper, thick paper, and a sheet for an overhead projector.

The sheet feeding portion 30 is located at the bottom of the image forming apparatus 2 and is equipped with the sheet cassette 31 that stacks and accommodates the sheets S and the feeding roller 32 that feeds the sheet S to the image forming portion 40.

The image forming portion 40 has the image forming unit 41, the toner bottle 42, the exposure device 43, the intermediate transfer unit 44, the secondary transfer portion 45 and the fixing device 46 to form an image on the sheet S.

The image forming unit 41 has the four image forming units 41y, 41m, 41c and 41k to form a toner image in four colors: yellow (y), magenta (m), cyan (c) and black (k). Each of these can be attached to and detached from the image forming apparatus 2 by a user. For example, the image forming unit 41y has the photosensitive drum 47y that forms a toner image, the electrically charged roller 48y, the developing sleeve 49y, an unshown drum cleaning blade, toner, and so on. Toner is supplied to the image forming unit 41y from the toner bottle 42y filled with toner. The other image forming units 41m, 41c and 41k have the same configuration as that of the image forming unit 41y except for the use of different toner colors, so a detailed description for the image forming units 41m, 41c and 41k is omitted.

The exposure device 43y is an exposure portion that exposes the surface of the photosensitive drum 47y to form an electrostatic latent image on the surface of the photosensitive drum 47y.

The intermediate transfer unit 44 is located in the downward direction D of the image forming unit 41. The intermediate transfer unit 44 has a number of rollers such as the drive roller 44a and primary transfer rollers 44y, 44m, 44c and 44k, and the intermediate transfer belt 44b that is wound around these rollers. The primary transfer rollers 44y, 44m, 44c and 44k are positioned opposite the photosensitive drums 47y, 47m, 47c and 47k, respectively, and abut on the intermediate transfer belt 44b. By applying a transfer bias with a positive polarity to the intermediate transfer belt 44b by the primary transfer rollers 44y, 44m, 44c and 44k, toner images with negative polarity on the photosensitive drums 47y, 47m, 47c and 47k are sequentially and multiply transferred on the intermediate transfer belt 44b. As a result, a full-color image is formed on the intermediate transfer belt 44b.

The secondary transfer portion 45 has the secondary transfer inner roller 45a and the secondary transfer outer roller 45b. By applying a secondary transfer bias with positive polarity to the secondary transfer outer roller 45b, the full color image formed on the intermediate transfer belt 44b is transferred to the sheet S. The secondary transfer inner roller 45a is placed inside the intermediate transfer belt 44b, and the secondary transfer outer roller 45b is located opposite the secondary transfer inner roller 45a via the intermediate transfer belt 44b.

The fixing device 46 has the fixing roller 46a and the pressure roller 46b. The toner image transferred to the sheet S is pressurized and heated to fix the image on the sheet S as the sheet S is held and conveyed between the fixing roller 46a and the pressure roller 46b. In this embodiment, the conveying portion frame 2b has the fixing device 46, but it is not limited to this configuration. For example, the image forming portion frame 2a may have the fixing device 46 and the conveying portion frame 2b may not have the fixing device 46. Naturally, each of the frames may have a fixing device.

The sheet conveying portion 50 has the pre-secondary-transfer conveying path 51, the pre-fixing conveying path 52, the discharge path 53 and re-conveying path 54 so that the sheet conveying portion 50 conveys the sheet S fed from the sheet feeding portion 30 from the image forming portion 40 to the sheet discharge portion 60.

The sheet discharge portion 60 has a pair of discharge rollers 61 located downstream of the discharge path 53 and the discharge port 62 located on the side of the left direction L of the image forming apparatus 2. The pair of discharge rollers 61 feeds the sheet S conveyed from the discharge path 53 from the nip portion and discharges it from the discharge port 62. The discharge port 62 can feed the sheet S to the post-processing device 103 located on the left direction L side of the image forming apparatus 2.

Figure 3:
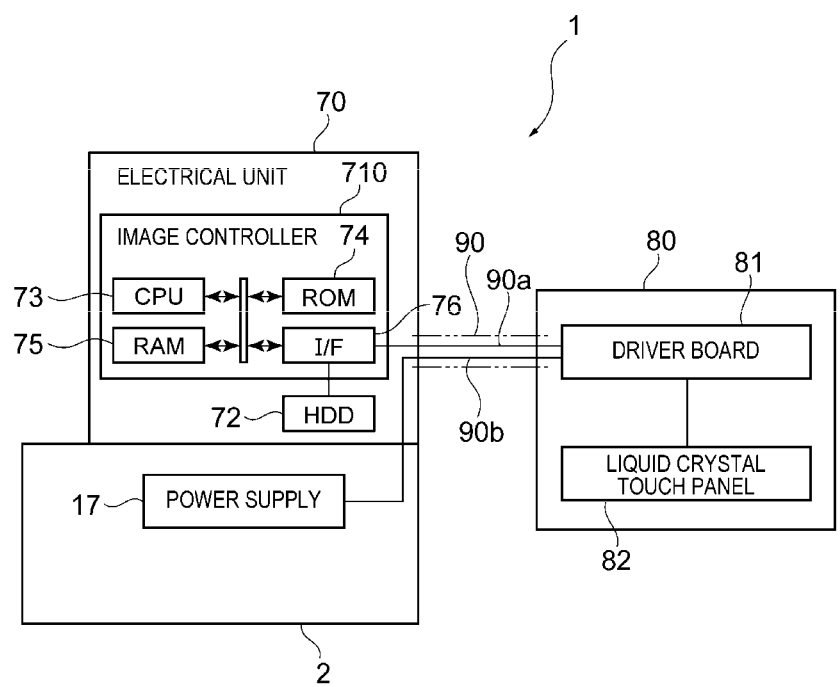
FIG. 3 is a diagram for describing the controlling configuration of an operation unit of the image forming system.

As shown in FIG. 3, the electrical unit 70 has the image controller 710, which is a control board including the control portion, and the hard disk drive (HDD) 72, which is a removable large capacity storage device. The image controller 710 is configured with a computer and has for example the CPU 73, the ROM 74 that stores a program to control each part, the RAM 75 that temporarily stores data, and the input/output circuit (I/F) 76 that inputs and outputs signals to and from the outside. The HDD 72 is a removable large capacity storage device for storing electronic data and stores mainly an image processing program, digital image data and incidental information of digital image data. The image data are read out from the HDD 72 during image forming.

The CPU 73 is a microprocessor that controls the entire image forming apparatus 2 and is the main member of the system controller. The CPU 73 is connected to the sheet feeding portion 30, the image forming portion 40, the sheet conveying portion 50, the sheet discharge portion 60, the HDD 72, and the operation unit 80 via the input/output circuit 76 to exchange signals with each portion and control its operation. A user can operate and set the image controller 710 through commands from an unshown computer connected to the image forming apparatus 2 or by operating the operation unit 80.

Each part of the image forming apparatus 2 can be controlled with the operation unit 80. The operation unit 80 is provided separately to the image forming apparatus 2 and has the driver board 81 and the display panel 82 (display portion). The display panel 82 is configured to display information necessary for a user to operate the image forming apparatus 2, such as the remaining amount of the sheets S and toner replenished in the image forming apparatus 2, a warning message when the consumables run out, and the procedure for replenishing the consumables. The display panel 82 is configured to accept an operation input from a user such as data for setting the size and basis weight of the sheet S, adjusting the image density, and setting the number of output sheets.

The operation unit 80 can be energized by being connected to the electrical unit 70 of the image forming apparatus 2 with the cable 90. The cable 90 includes the bundle of signal line 90a and the power line 90b, but the signal line 90a and power line 90b may be accommodated in separate cables. The signal line 90a connects the input/output circuit 76 of the image controller 710 with the driver board 81, and the power line 90b connects the power supply 17 of the image forming apparatus 2 with the driver board 81.

The image forming operation of the image forming apparatus 2 configured as above will be described next.

When the image forming operation starts, the photosensitive drums 47y, 47m, 47c and 47k first rotate and their surfaces are charged by the charging rollers 48y, 48m, 48c and 48k. Then, a laser beam is emitted to the photosensitive drums 47y, 47m, 47c and 47k by the exposure devices 43y, 43m, 43c and 43k based on image information so that an electrostatic latent image is formed on the surface of the photosensitive drums 47y, 47m, 47c and 47k. When toner adheres to this electrostatic latent image, it is developed and visualized as a toner image, and then is transferred to the intermediate transfer belt 44b.

Meanwhile, in parallel with this toner image forming operation, the feed roller 32 rotates to feed the topmost sheet S in the sheet cassette 31 while separating it from the other sheets. The sheet S is then conveyed to the secondary transfer portion 45 via the pre-secondary-transfer conveying path 51, in synchronization with the timing of the toner image on the intermediate transfer belt 44b. Next, the image is transferred from the intermediate transfer belt 44b to the sheet S and the sheet S is conveyed to the fixing device 46, where the unfixed toner image is heated and pressurized to fix the image on the surface of the sheet S. Then, the fixed sheet S is discharged from the discharge port 62 by the discharge roller pair 61 and supplied to the post-processing device 103. The fixed sheet S is discharged from the discharge port 62 by the pair of discharge rollers 61 and supplied to the post-processing device 103.

(Configuration of Operation Unit)

First, outlines of the electrical unit 70, the operation unit 80, the cable 90, the cover 101, and the opening 102 will be described.

The electrical unit 70 is provided on the back surface of the image forming apparatus 2. A connector (not shown) provided at one end of the cable 90 is connected to the electrical unit 70. The cable 90 transmits a control signal for controlling the operation unit 80 from electrical unit 70 to the operation unit 80. The cable 90 serves to communicably connect the image forming apparatus 2 and the operation unit 80. The other end of cable 90 is provided with a connector (not shown) and is connected to the operation unit 80. Thus, the operation unit 80 is not secured to the top surface 109, although it is connected to the image forming apparatus 2 by the cable 90. Further, the operation unit 80 is movable with respect to the top surface 109 of the image forming apparatus 2. Therefore, a user can freely locate the operation unit 80 at any position on the top surface 109 as long as the cable 90 reaches. Thus, "freely" here means that the operation unit 80 can be placed at any position on the top surface 109 since the operation unit 80 is not secured to the top surface 109 with for example screws or the like.

In this embodiment, the image forming apparatus 2 and the operation unit 80 communicate bidirectionally via the cable 90. Therefore, as mentioned above, the operation unit 80 can be freely repositioned within the length of cable 90.

FIGS. 4 and 5 illustrate the positions where the operation unit 80 can be placed on the top surface 109. For example, as shown in FIG. 4, the operation unit 80 can be placed in the space closer to the document reading device 115 on the top surface of the image forming apparatus 2. Further, as shown in FIG. 5, the operation unit 80 can be placed in the space on the top surface 106 of the feeding device 105 as well. In addition to the arrangement shown in FIGS. 4 and 5, the operation unit 80 can be placed on the top surface of the image forming system 1, such as the top surface 104 of the post-processing device 103. In addition to the space on the top surface of the image forming system 1, it is also possible to install a workbench or the like near the image forming system 1 and to place the operation unit 80 on it (not shown).

Figure 6A:
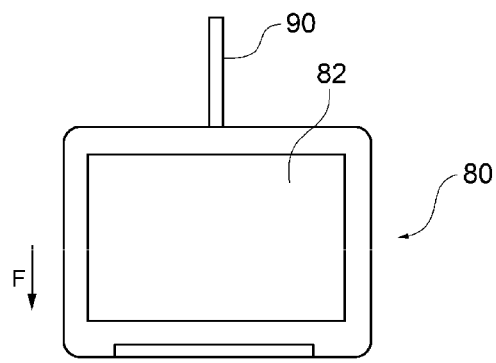
FIGS. 6A, 6B and 6C are diagrams for describing the operation unit.
Figure 6B:
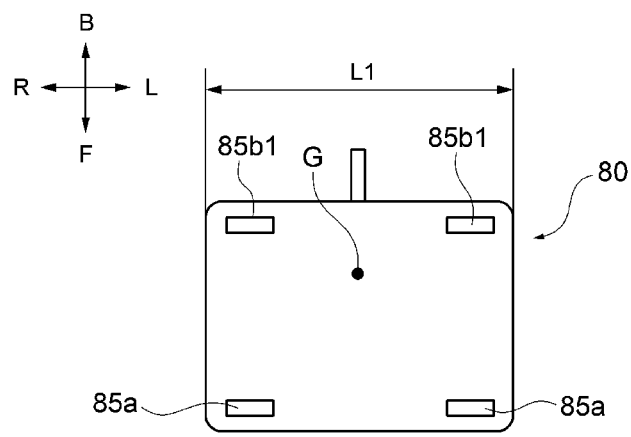
Figure 6C:
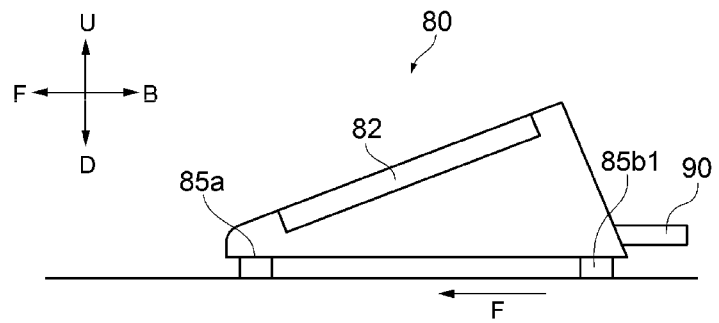

FIG. 6A shows the operation unit 80 viewed from above along the vertical direction, FIG. 6B shows the bottom of the operation unit 80 and FIG. 6C shows a side view of the operation unit 80.

As shown in FIG. 6A, the operation unit 80 has the display panel 82. The display panel 82 of the operation unit 80 in this embodiment is a liquid crystal touch panel. Namely, the display panel 82 is configured to accept touch operation by a user. Touch operation refers to the operation of touching the display panel 82 with a fingertip, and is the generic term for operations such as flicking and scrolling. The cable 90 leads out from the back of the operation unit 80. As shown in FIG. 6B, the rubber feet 85 (85*a*, 85*b*1) as an example of an elastic member are provided on the bottom of the operation unit 80. These rubber feet 85 contact the top surface 109 and are examples of the first to fourth contact portions. The rubber feet 85 are the portions that contact the top surface 109 when the operation unit 80 is placed on the top surface 109. The rubber feet 85 are made from an elastic material whose surface has a high coefficient of friction. The rubber feet 85 are configured to deflect slightly when the operation unit 80 is placed on the top surface 109. Therefore, it is possible to support the operation unit 80 at four points, as in this embodiment. A plane is mathematically determined with three points, but all four points can contact the top surface 109 as one of the rubber feet 85 deflects. In this embodiment of the operation unit 80, two rubber feet 85*a* are provided on the front side and two rubber feet 85*b*1 are provided on the rear side. This reduces the risk of the operation unit 80 wobbling when the user presses any part of the display panel 82.

As shown in FIG. 6B, the four rubber feet 85 are arranged to surround the center of gravity G of the operation unit 80. In other words, the center of gravity G is located within the area surrounded by the four rubber feet 85. This arrangement ensures that the operation unit 80 is supported stably by the four rubber feet 85. In other words, operability for the user is improved. When the operation unit 80 is viewed from above along the vertical direction, the rubber foot 85*a* is located upstream from the center of gravity G and the rubber foot 85*b*1 is located downstream from the center of gravity G in the direction that is going up along the slope of the display panel 82 and is perpendicular to both the direction (the direction perpendicular to the paper surface) perpendicular to both the direction perpendicular to the direction perpendicular to the display surface 820 described later and the vertical direction, and the direction perpendicular to the display surface 820.

In addition, one of the two rubber feet 85*b*1 is provided at the right end portion of the bottom of the operation unit 80 and the other of the two rubber feet 85*b*1 is provided at the left end portion of the bottom of the operation unit 80. Since it is assumed here that the operation unit 80 located on the top surface 109 is viewed from the bottom side of the operation unit 80, the left side of the paper surface is defined as the right side of the operation unit 80 and the right side of the paper surface as the left side of the operation unit 80. Assuming that the width of the operation unit 80 in the left-right directions is L1, it is preferable that when L1 is divided into four equal parts, one of the rubber feet 85*b*1 should be located in the rightmost (one end side) area, and the other of the rubber feet 85*b*1 should be located in the leftmost (the other end side) area. Since one of the two rubber feet 85*b*1 are disposed apart from each other as describe above, the stability of the operation unit 80 is improved when it is placed on the top surface 109.

The left-right directions here are the directions perpendicular to both the vertical direction and the direction perpendicular to the display surface 820, which is described later, and also are the width directions of the operation unit 80.

FIG. 6C shows the operation unit 80 placed on the top surface 109, viewed from the right side of the operation unit 80. Here, the surface of the top surface 109 followed by the rubber feet 85 when the operation unit 80 is placed is referred to as the rubber foot surface. As mentioned above, if the rubber feet 85 are rigid, when the operation unit 80 is placed on the top surface 109, one of the four points will lift up. This is unavoidable due to component tolerances. When at least two or more of the four rubber feet 85 are elastic, all four rubber feet 85 will follow the top surface 109. This allows a user to stably operate the operation unit 80 on the top surface 109.

FIG. 6C is used here to illustrate the advantage of the cable 90 leads out from the back side of the operation unit 80. As shown in FIG. 6C, the cable 90 leads out from the operation unit 80 in the direction of going up along the display panel 82 when the operation unit 80 is viewed along the vertical direction. The leading out direction coincides with the direction perpendicular to both the direction (the direction perpendicular to the paper surface) perpendicular to both the direction perpendicular to the direction perpendicular to the display surface 820 described later and the vertical direction, and the direction perpendicular to the display surface 820 when the operation unit 80 is viewed along the vertical direction.

In this way, the cable 90 leads out from the back side of the operation unit 80 toward the backward direction, so that the connection between the cable 90 and the operation unit 80 is not visible to a user. This improves the designability of the operation unit 80.

Figure 7A:
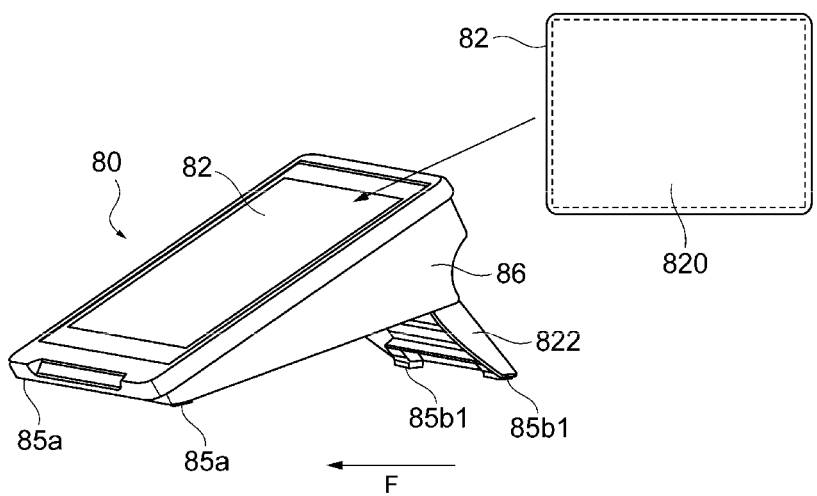
FIGS. 7A and 7B are schematic diagrams of perspective views of the operation unit.
Figure 7B:
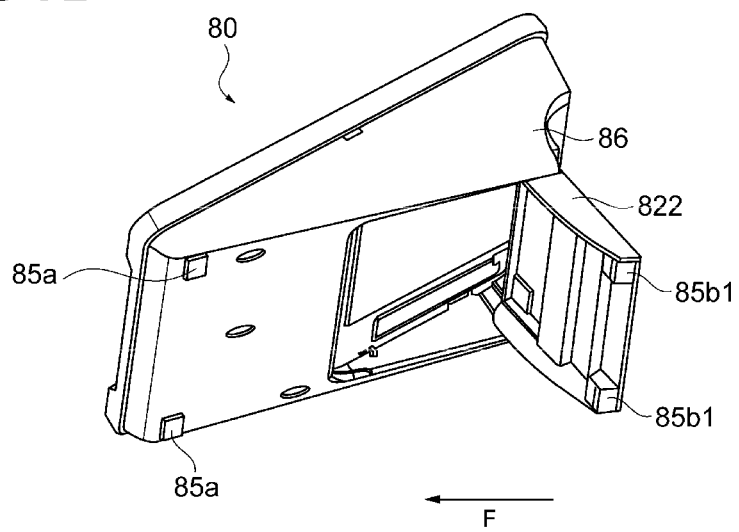

FIG. 7A is a diagram showing a perspective view of the operation unit 80 and an enlarged view of the display panel 82. FIG. 7B is a diagram of a perspective view of the operation unit 80 viewed from the bottom. As shown in FIGS. 7A and 7B, the operation unit 80 has the support base 86. The support base 86 supports the display panel 82. More specifically, the support base 86 supports the display panel 82 when the operation unit 80 is placed on the top surface 109 such that the display panel 82 takes a predetermined angle to the top surface 109.

The support base 86 has the rubber feet 85 (85*a*, 85*b*1). More specifically, the rubber feet 85*a* are provided at the right and left end portions of the front side of the support base 86, and arm 822 is provided at the back side of the support base 86. The rubber feet 85*b*1 are provided on the right and left end portions of this arm 822. When these four rubber feet 85 are in contact with the top surface 109, the angle of the display panel 82 relative to the top surface 109 is determined at a predetermined angle.

The display panel 82 has the display surface 820 that can display information about image formation, such as a button for starting copying, a screen for setting the paper size, a screen for setting the number of sheets to be printed, and a screen for displaying the remaining toner level. In this embodiment, the display surface 820 are provided on the display panel 82 except for the end portions, but the entire surface of the display panel 82 can be used to display information about image formation and screens for print settings. In any case, the inclination angle of the display surface 820 with respect to the top surface 109 means the angle that the center area of the display panel 82 (the area corresponding to the display surface 820 in FIG. 7A) makes with respect to the top surface 109.

Figure 8A:
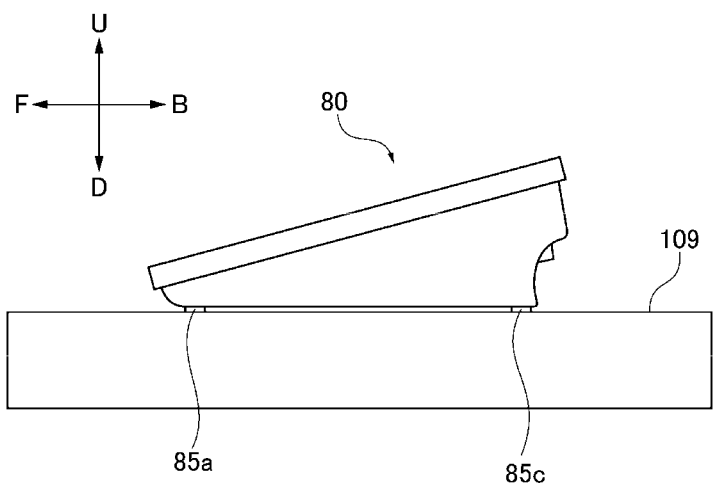
FIGS. 8A and 8B are diagrams for describing a mechanism for adjusting a tilt angle of a display panel with respect to the top surface.
Figure 8B:
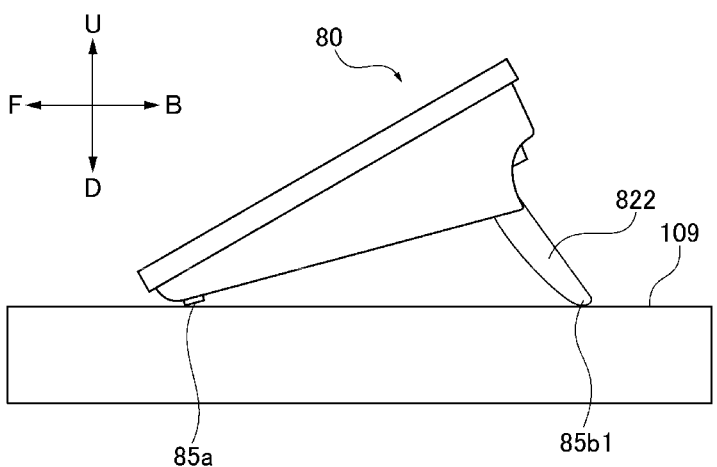

FIG. 8 illustrates the function of the arm 822 provided at the operation unit 80. FIG. 8A shows the arm 822 accommodated in the back side of the operation unit 80. FIG. 8B shows the operation unit 80 with the arm 822 raised.

As shown in FIG. 8, the arm 822 that can be rotated with respect to the operation unit 80 is provided on the bottom side of the operation unit 80. The angle of the display panel 82 relative to the top surface 109 can be adjusted by accommodating the arm 822 in the bottom side of the operation unit 80 (FIG. 8A) or by raising the arm 822 (FIG. 8B). In this embodiment, this angle has 30 degrees when the arm 822 is accommodated in the bottom side of the operation unit 80. When arm 822 is in the raised position, the angle has 45 degrees. Thus, the angle of the display panel 82 with respect to the top surface 109 can be adjusted, which has the effect of making it easy to use for various users with different eye level, such as a user in a wheelchair or a tall user.

(Cable)

Figure 9A:
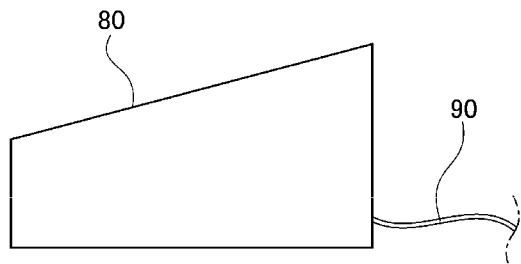
FIGS. 9A and 9B are diagrams for describing an outlet of a cable from the operation unit.
Figure 9B:
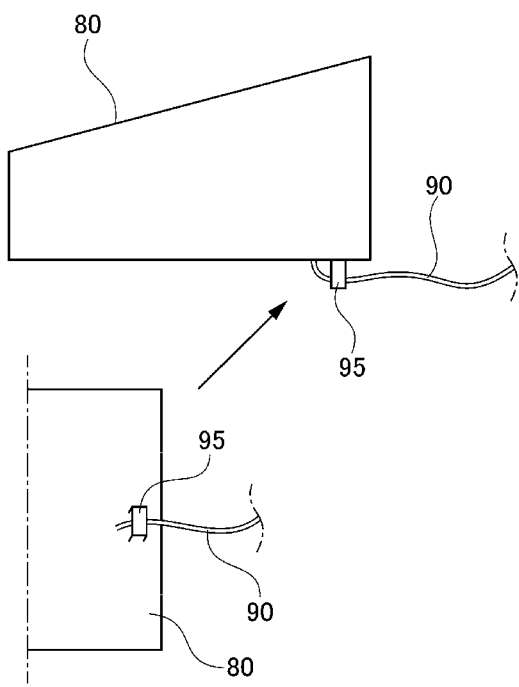

FIGS. 9A and 9B illustrate the directions of the cable 90 from the operation unit 80. FIG. 9A is a schematic diagram of the operation unit 80 viewed from the left side of the operation unit 80. The example in FIG. 9A has the configuration in which the cable 90 leads out from the wall portion of the back side of the operation unit 80.

Since the cable 90 leads out from the wall portion of the back side of the operation unit 80 in this manner, a user who operates the operation unit 80 can concentrate on the operation of the operation unit 80 because the cable 90 is hard to see.

The top surface 109 on which the operation unit 80 is placed is often used as a work space. In other words, a user may work in a situation where work items or printed materials are placed next to or in front of the operation unit 80. In this case, the cable 90 can be prevented from getting in the way.

Thus, in the operation unit 80, which is placed freely on the top surface 109, the cable 90 leads out from the wall portion of the back side of the operation unit 80 to improve workability.

FIG. 9B shows an embodiment of a configuration in which the cable 90 leads out from the bottom side of the operation unit 80 and the cable 90 extends along the back side of the operation unit 80. As shown in FIG. 9B, the cable 90 leads out from the bottom side of the operation unit 80. The clamp 95 for fastening a portion of the cable 90 to the operation unit 80 is provided farther back than the outlet. Since the clamp 95 is located farther back than the outlet, the cable 90 extends from the outlet to the back of the operation unit 80. This configuration has the same effect as the configuration in which the cable 90 leads out from the wall portion of the back side of the operation unit 80.

Figure 10:
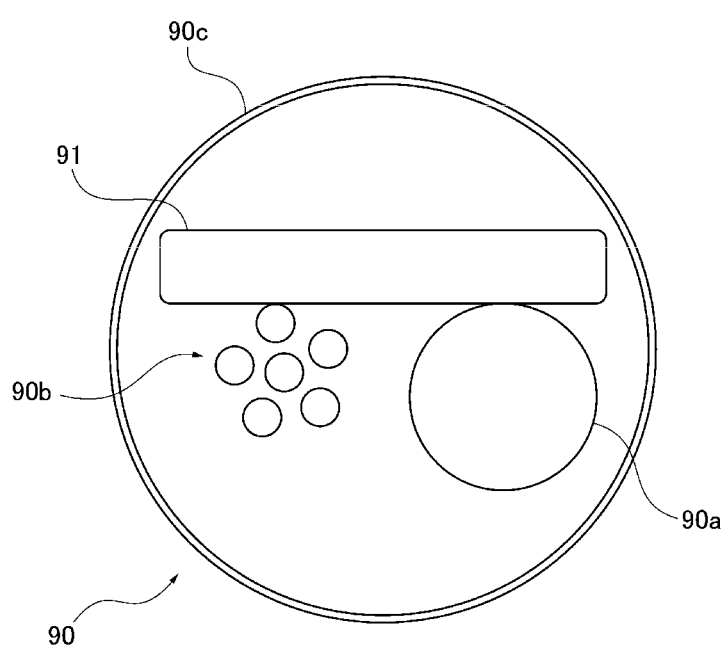
FIG. 10 is a diagram of a cross-sectional view of the cable.

FIG. 10 shows a cross-sectional view of the cable 90. As shown in FIG. 10, the cable 90 has the signal line (video cable) 90*a*, the power line (power cable) 90*b*, the reinforcement member 91 (elastic member), and the sheath 90*c* that encases these things. The signal line 90*a* and power line 90*b* are wires used to send electrical signals between the image forming apparatus 2 and the operation unit 80, and the signal line 90*a* and the power line 90*b* are collectively referred to as electrical wires. In other words, the cable 90 has the signal line 90*a* and the power line 90*b* as electrical wires, the reinforcement member 91 as an elastic member, and a sheath 90*c* that encases these things.

The signal line 90*a* connects the input/output circuit 76 of the image controller 71 to the driver board 81. Video signals (a type of electric signal) are transmitted from the input/output circuit 76 to the driver board 81, and based on these video signals, images are displayed on the display panel (LCD touch panel) 82. The electric signal that transmits through signal line 90*a* is also a type of signal used to instruct the image forming portion 40 to form an image. The signal line 90*a* includes a signal line that transmits signals and is covered with a polyvinyl chloride sheath material.

The power line 90*b* connects the power supply 12 of the image forming apparatus 2 to the driver board 81. Power is supplied to the operation unit 80 via the power line 90*b*. As a result, the driver board 81 is driven and the display panel (LCD touch panel) 82 displays an image. Here, the electric power supplied to the operation unit 80 via the power line 90*b* is also considered as a type of electric signal.

The reinforcement member 91 is a long plate-shaped member. Further, the reinforcement member 91 is an elastic member made of resin and having elasticity. The reinforcement member 91 is disposed along the signal line 90*a* and the power line 90*b*. The details will be described later, but the reinforcement member 91 has the function of preventing the signal line 90a and the power line 90b from being disconnected.

The sheath 90c encapsulates the signal line 90a, the power line 90b, and the reinforcement member 91. The sheath 90c in this embodiment has polyethylene terephthalate (PET) as main material and is a net-like contractible member. The elasticity of the sheath 90c is much less than that of the reinforcement member 91. In other words, the effect of the elasticity of the sheath 90c itself on the entire cable 90 is almost zero. The main function of the sheath 90c is to reduce the risk of the signal line 90a, the power line 90b, and reinforcement member 91 being exposed to the outside and damaging their appearance. In addition to this main effect, since the sheath 90c in this embodiment is contractible, the sheath 90c also has the effect of bundling the signal line 90a, the power line 90b, and the reinforcement member 91. In other words, in this embodiment, the sheath 90c is used to improve the aesthetic aspect of the image forming system 1, but it is not required. Since some users may not require an aesthetic aspect of the image forming system 1, the cable 90 can be configured without the sheath 90c for such users.

(First Securing Method for Cable)

Figure 11A:
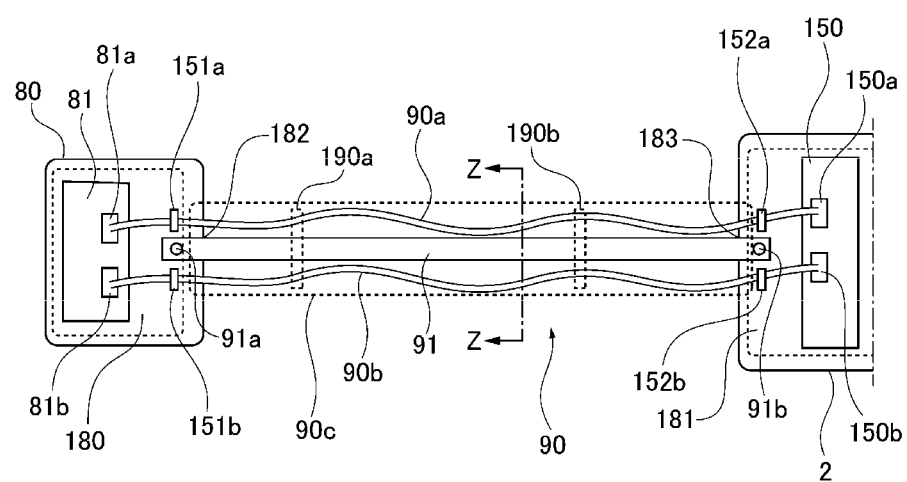
FIGS. 11A and 11B show the cable and a reinforcement member.

FIG. 11A is used here to describe how to secure the cable 90 to the operation unit 80 and the image forming apparatus 2. FIG. 11A illustrates how to secure the cable 90 to the operation unit 80 and the image forming apparatus 2. FIG. 11A is a diagram showing the relationship between the lengths of the signal line 90a and the power line 90b and the reinforcement member 91.

First, the method of securing the signal line 90a to the operation unit 80 and the image forming apparatus 2 will be described.

As shown in FIG. 11A, one end of the signal line 90a is connected to the connector 81a on the driver board 81 of the operation unit 80. On the other hand, the other end of the signal line 90a is connected to the connector 150a on the main body board 150 of the image forming apparatus 2. The signal line 90a is electrically connected to the input/output circuit 76 of the image controller 710 via the connector 150a.

One end side of the signal line 90a leads out from the outlet 182 of the frame 180 of the operation unit 80. The signal line 90a extends from the inside of the operation unit 80 outward through the outlet 182. The frame 180 is, for example, an exterior cover of the operation unit 80. Therefore, the outlet 182 in the operation unit 80 here is formed by an end portion of the frame 180 of the operation unit 80.

Furthermore, the portion of the one end side of the signal line 90a that is connected to the connector 81a and the portion that leads out from the outlet 182 is secured to the frame 180 by, for example, the band 151a. The frame 180 can be a part of the frame that forms the exterior cover, or it can be a metal plate secured to the exterior cover. By making the frame 180 a separate component from the exterior cover of the operation unit 80, when the cable 90 is pulled, the load is transmitted to the frame 180 via the band 151a. The driver board 81 is secured to the frame 180 by screws or other means, independent of the band 151a. Therefore, when the cable 90 is pulled, the load is not directly transmitted to the connector 81a, but through the frame 180. By using a metal plate for the frame 180, rigidity is also ensured, which reduces the risk of the connector 81a being pulled out of the driver board 81 or causing poor contact. This holds good for the relationship between the signal line 90a and the frame 181, and the relationship between the power line 90b and the frames 180 and 181, as described below.

The band 151a in this embodiment is a binding band, which encases the signal line 90a and the signal line 90a is secured to the frame 180. The band 151a does not have to be a binding band, but can be any other component that can secure the signal line 90a to the frame 180. For example, a wire saddles may be used for the band 151a. In this way, the signal line 90a is secured to the frame 180 by the band 151a. This reduces the risk of the signal line 90a being disconnected from the connector 81a, since the loaded is not applied to the connector 81a even if the portion of the signal line 90a exposed from the outlet 182 is pulled.

The other end side of the signal line 90a leads out from the outlet 183 provided on the frame 181 of the image forming apparatus 2. The signal line 90a conducts from the inside of the image forming apparatus 2 to the outside via the outlet 182. Here, the frame 181 is, for example, an exterior cover of the image forming apparatus 2. Thus, the outlet 183 provided in the image forming apparatus 2 is formed by an end portion of the frame 181 of the image forming apparatus 2.

Similarly, the other end side of the signal line 90a between the portion connected to the connector 150a and the portion leading out of the outlet 183, is secured to the frame 181 by the band 152a, for example. The frame 181 can be a part of the exterior cover of the frame of the image forming apparatus 2, or it can be a metal plate secured to the exterior cover. The band 152a in this embodiment is a binding band, which encases the signal line 90a and secures the signal line 90a to the frame 181. In this way, the signal line 90a is secured to the frame 181 by the band 152a. This reduces the risk of the signal line 90a being disconnected from the connector 150a, since the load is not applied to the connector 150a even if the portion of the signal line 90a exposed from the outlet 183 is pulled.

Next, the method of securing the power line 90b to the operation unit 80 and the image forming apparatus 2 will be explained.

As shown in FIG. 11A, one end side of the power line 90b is connected to the connector 81b on the driver board 81 of the operation unit 80. On the other hand, the other end side of the power line 90b is connected to the connector 150b on the main body board 150 of the image forming apparatus 2. The power line 90b is electrically connected to the power supply 17 via the connector 150b.

The one end side of the power line 90b leads out from the outlet 182 provided on the frame 180 of the operation unit 80. Similar to the signal line 90a, the power line 90b also leads out from the inside of the operation unit 80 through the outlet 182.

Furthermore, the portion of the one end side of the power line 90b that is connected to the connector 81b and the portion that leads out from the outlet 182 is secured to the frame 180 by, for example, the band 151b. The frame 180 can be a part of the frame that forms the exterior cover, or it can be a metal plate secured to the exterior cover. The band 151b in this embodiment is a binding band, which encases the power line 90b and secures the power line 90b to the frame 180. The band 151b does not have to be a binding band, but can be any other component that can secure the power line 90b to the frame 180. For example, a wire saddle may be used for the band 151b. In this way, the power line 90b is secured to the frame 180 by the band 151b. This reduces the risk of the power line 90b being disconnected from the connector 81b, since the load is not applied to the connector 81b even if the portion of the power line 90b exposed from the outlet 182 is pulled.

The other end side of the power line 90b leads out from the outlet 183 provided on the frame 181 of the image forming apparatus 2. Similar to the signal line 90a, the power line 90b also leads out from the inside of the image forming apparatus 2 through the outlet 183.

Similarly, the other end side of the power line 90b between the portion connected to the connector 150b and the portion leading out of the outlet 183, is secured to the frame 181 by the band 152b, for example. The frame 181 can be a part of the exterior cover of the frame of the image forming apparatus 2, or it can be a metal plate secured to the exterior cover. The band 152b in this embodiment is a binding band, which encases the power line 90b and secures the power line 90b to the frame 181. In this way, the power line 90b is secured to the frame 181 by the band 152b. This reduces the risk of the power line 90b being disconnected from the connector 150b, since the load is not applied to the connector 150b even if the portion of the power line 90b exposed from the outlet 183 is pulled.

Next, the method of securing the reinforcement member 91 to the operation unit 80 and the image forming apparatus 2 will be described. The configuration of the reinforcement member 91 will be explained in detail later.

As shown in FIG. 11A, the reinforcement member 91 is provided along the signal line 90a and the power line 90b from the image forming apparatus 2 to the operation unit 80. One end portion of the reinforcement member 91 is secured to the frame 180 of the operation unit 80 with, for example, the screw 91a. The other end side of the reinforcement member 91 is secured to the frame 181 of the image forming apparatus 2 with the screw 91b, for example. The portions of the reinforcement member 91 that is secured to the frame 180 by the screw 91a and to the frame 181 by the screw 91b are referred to as a secured portion, respectively.

The one end side of the reinforcement member 91 leads out from the outlet 182 on the frame 180 of the operation unit 80. Here, the frame 180 is, for example, an exterior cover of the operation unit 80. However, the frame 180 may also be a metal plate or the like secured to the exterior cover.

Similarly, the other end side of the reinforcement member 91 leads out from the outlet 183 provided on the frame 181 of the image forming apparatus 2. However, the frame 181 may be a metal plate or the like secured to the exterior cover.

As described above, the signal line 90a, the power line 90b and the reinforcement member 91 are all secured to the frame 180 of the operation unit 80 and the frame 181 of the image forming apparatus 2.

The portion where the signal line 90a is secured to the frame 180 with the band 151a is referred to as a secured end portion on the one end side, and the portion where the signal line 90a is secured to the frame 181 by the band 152a is referred to as a secured end on the other end side. The distance of the signal line 90a from the secured end portion on the one end side to the secured end portion on the other end side is referred to as L1.

The portion where the power line 90b is secured to the frame 180 with the band 151b is referred to as a secured end portion on the one end side, and the portion where the power line 90b is secured to the frame 181 by the band 152b is referred to as a secured end on the other end side. The distance of the power line 90b from the secured end on the one end side to the secured end on the other end side is referred to as L2.

The portion where the reinforcement member 91 is secured to the frame 180 with the screw 91a is referred to as a secured end on the one end side, and the portion where the reinforcement member 91 is secured to the frame 181 by the screw 91b is referred to as a secured end portion on the other end side. The distance of the reinforcement member 91 from the secured end portion on the one end side to the secured end on the other end side is referred to as L3.

In this embodiment, the distance L3 of the reinforcement member 91 is set to be shorter than the distance (length) L1 of the signal line 90a and the distance (length) L2 of the power line 90b. As a result, even when the reinforcement member 91 is tense without deflection, deflection (excess length) is generated in the area of the signal line 90a between the secured end portion at the one end side and the secured end portion at the other end side. Similarly, deflection (excess length) is created in the area of the power line 90b between the secured end portion at the one end side and the secured end portion at the other end side.

In this way, as shown in FIG. 11A, the portion of signal line 90a from the one secured end portion on the one end side to the secured end portion on the other end side and the portion of power line 90b from the secured end portion on the one secured end side to the secured end portion on the other end side are both provided with an extra length. The reinforcement member 91 is made from resin and is elastically deformable, as described below, so that the cable 90 is deformable. The distances L1 to L3 are in the relationship described above to prevent the disconnection of the signal line 90a and the power line 90b even when the cable 90 is deformed.

In the above embodiment, the one end side of the signal line 90a is secured to the frame 180 by the band 151a and the other end side of the signal line 90a is secured to the frame 181 by the band 152a. Further, the one end side of the power line 90b is secured to the frame 180 by the band 151b and the other end side of the power line 90b is secured to the frame 181 by the band 152b. However, for example, only one end side of the power line 90b may not be secured to the frame 180. In this case, the one end side of the signal line 90a is still secured to the frame 180 by the band 151a and the other end side of the signal line 90a is secured to the frame 181 by the band 152a. Therefore, even if the cable 90 is deformed, the disconnection of at least the signal line 90a can be reduced.

In addition, the secured end portions can be made by parts of the signal line 90a and the power line 90b being wound around parts of the frame 180 and the frame 181 without using components such as the bands 151a, 151b, 152a, and 152b.

Next, the configuration of the sheath 90c, which is one of the components of the cable 90, will be described. The sheath 90c encases the signal line 90a, the power line 90b and the reinforcement member 91. The one end side of the sheath 90c leads out from the outlet 182 formed on the frame 180 of the operation unit 80. The outlet 182 is a common opening through which the signal line 90a, the power line 90b and the reinforcement member 91 lead out. The sheath 90c is made from a material that can shrink when heat is applied. The signal line 90a, the power line 90b and the reinforcement member 91 can be combined into a single bundle by applying heat to the sheath 90c while the signal line 90a, the power line 90b and the reinforcement member 91 pass through the sheath 90c.

On the other hand, the other end side of the sheath 90c leads out from the outlet 183 formed on the frame 181 of the image forming apparatus 2. The outlet 183 is a common opening through which the signal line 90a, the power line 90b and the reinforcement member 91 lead out. The sheath 90c is made from a material that can shrink when heat is applied. The signal line 90a, the power line 90b and the reinforcement member 91 can be combined into a single bundle by applying heat to the sheath 90c while the signal line 90a, the power line 90b and the reinforcement member 91 pass through the sheath 90c.

The sheath 90c has less elasticity than the reinforcement member 91. Therefore, the stiffness of the cable 90 is almost unaffected by the sheath 90c. The sheath 90c in this embodiment has the effect of encasing and concealing the signal line 90a, the power line 90b and the reinforcement member 91 from the outside. This prevents aesthetic degradation due to the exposure of various cables. Although the sheath 90c has the effect of concealing the signal line 90a, the power line 90b and the reinforcement member 91, it is not necessary to conceal them such that they are not visible at all. As can be understood from the fact that the sheath 90c in the embodiment is made from a net-like contractible member, it is allowed that the signal line 90a and the power line 90b are slightly visible from the outside. In other words, the sheath 90c encases the signal line 90a and the power line 90b to bundle the various cables together and to prevent most of them from being exposed.

In the above embodiment, the sheath 90c is used to protect the signal line 90a, the power line 90b and the reinforcement member 91 from the inside of the operation unit 80 to the inside of the image forming apparatus 2 through the outlets 182, 183. However, the present invention is not limited to this configuration. For example, the sheath 90c may be configured to encase the signal line 90a, the power line 90b and the reinforcement member 91 from the inside to the outside through at least each of the outlets 182, 183.

As shown in FIG. 11A, the signal line 90a and the power line 90b are bundled with the reinforcement member 91 by means of the bands 190a and 190b inside the sheath 90c, and are secured to the reinforcement member 91. As a result, even if a force is applied to the cable 90 that causes the cable 90 to be stretched in the portion between the band 190a and the band 190b, the disconnection of the signal line 90a and the power line 90b is reduced in this portion of the cable 90.

Figure 12A:
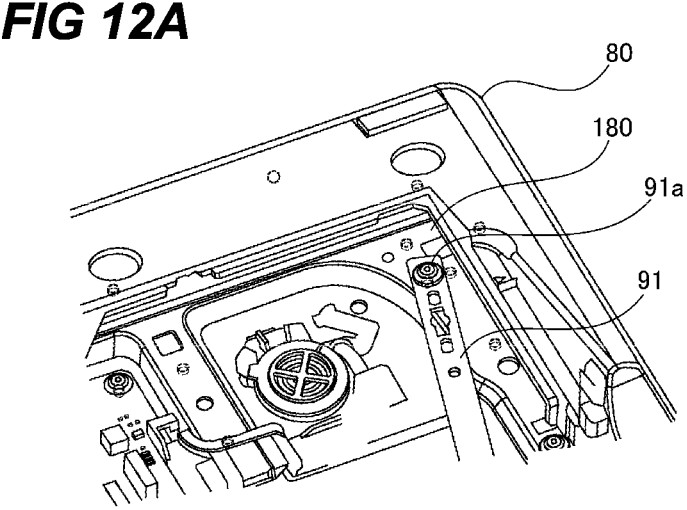
FIGS. 12A and 12B are diagrams showing fixing locations of the reinforcement member to the operation unit and image forming apparatus.
Figure 12B:
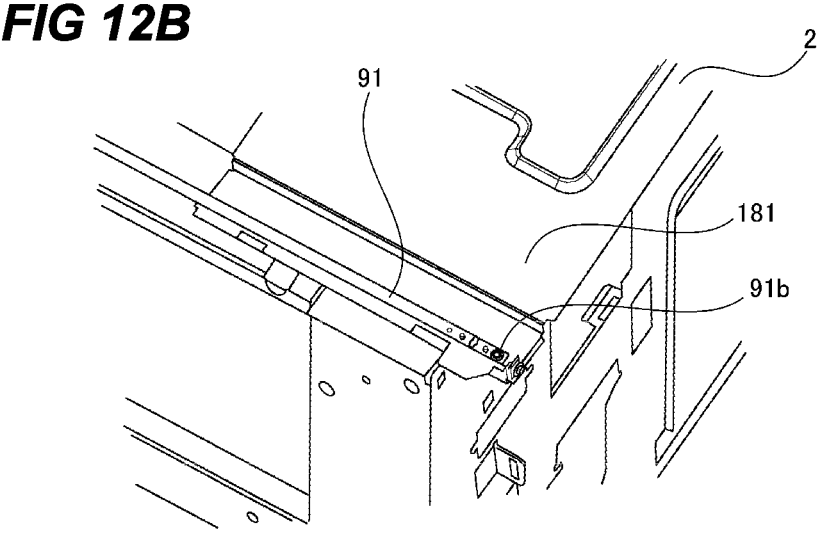

FIGS. 12A and 12B also show the specific locations where the signal line 90a, the power line 90b and the reinforcement member 91 are secured. As shown in FIG. 12A, in this embodiment, the frame 180 is a metal plate that is exposed when the exterior cover on the bottom side of the operation unit 80 is removed. The one end side of the reinforcement member 91 is secured to the frame 180 here. Although not shown in the figure, the one end side of the signal line 90a and the one end side of the power line 90b are also secured to this metal plate.

As shown in FIG. 12B, in this embodiment, the frame 181 is a metal plate that is exposed when the exterior cover of the top surface 109 of the imaging forming apparatus 2 is removed. The one other end side of the reinforcement member 91 is secured to the frame 181 here. Although not shown in the figure, the other end side of the signal line 90a and the other end side of the power line 90b are also secured to this metal plate.

(Second Securing Method for Cable)

Figure 11B:
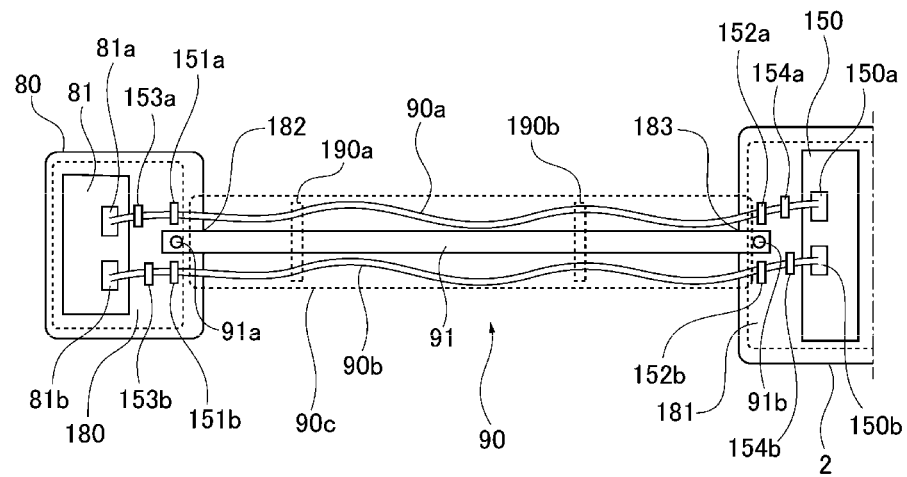

In the description using FIG. 11A, the configuration is exemplified in which the signal line 90a and the power line 90b are secured at a single point on each of the one side and the other end side. However, the present invention is not limited to this configuration. As shown in FIG. 11B, the signal line 90a and the power line 90b may be secured at multiple points on each of the one side and the other end side.

A method of securing the cable 90 to the operation unit 80 and the image forming apparatus 2 will be described using FIG. 11B, which is to describe the relationship between the lengths of the signal line 90a and the power line 90b and the reinforcement member 91.

As shown in FIG. 11B, the one end side of the signal line 90a is secured to the frame 180 by the band 153a in addition to the band 151a. The other end side of the signal line 90a is secured to the frame 181 by the band 154a in addition to the band 152a. In this manner, the one end side and the other end side of the signal line 90a are respectively secured to the frames 180 and 181 at multiple points. As a result, the signal line 90a can be secured to the frames 180 and 181 more reliably than the configuration in which they are secured at a single point. In this case, the secured end portion on the one end side of the signal line 90a described above refers to the portion where the signal line 90a is secured to the frame 180 by the band 151a. Further, the secured end portion on the other end side of the signal line 90a refers to the portion where the signal line 90a is secured to the frame 181 by the band 152a. In this embodiment, the "secured end portion" refers to the point closest to the outlet when there are multiple secured points. Even if there are three or more secured points, the point closest to the outlet refers to the secured end portion. In other words, when the exposed portion of the signal line 90a is pulled from the outlet, the band that first receives the load refers to the secured end portion.

As shown in FIG. 11B, the one end portion of the power line 90b is secured to the frame 180 by the band 153b in addition to the band 151b. The other end side of the power line 90b is secured to the frame 181 by the band 154b in addition to the band 152b. In this manner, the one end side and the other end side of the power line 90b are respectively secured to the frames 180 and 181 at multiple points. As a result, the power line 90b can be secured to the frames 180 and 181 more reliably than the configuration in which they are secured at a single point. In this case, the secured end on the one end side of the power line 90b described above refers to the portion where the power line 90b is secured to the frame 180 by the band 151b. Further, the secured end on the other end side of the power line 90a refers to the portion where the power line 90b is secured to the frame 181 by the band 152b. In this embodiment, the "secured end portion" refers to the point closest to the outlet when there are multiple secured points. Even if there are three or more secured points, the point closest to the outlet refers to the secured end portion. In other words, when the exposed portion of the power line 90b is pulled from the outlet, the band that first receives the load refers to the secured end portion.

(Reinforcement Member)

Figure 13A:
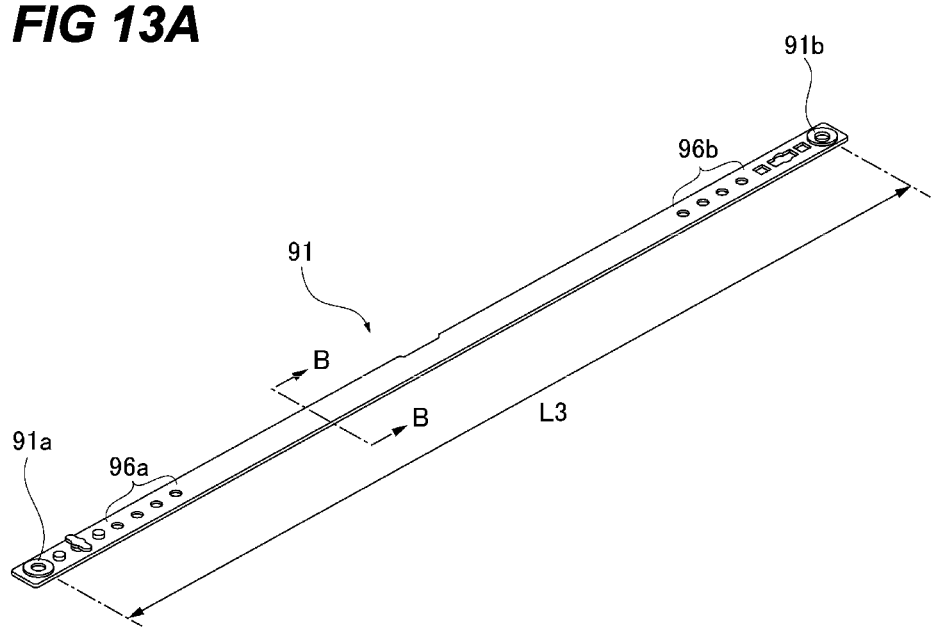
FIGS. 13A and 13B are diagrams showing the reinforcement member.

FIG. 13A is a diagram showing a perspective view of the reinforcement member 91. The reinforcement member 91 is a long member, and its material is resin such as nylon. Therefore, the reinforcement member 91 is an elastic member capable of elastic deformation. Although the reinforcement member 91 in this embodiment is a plate-like member, it may be a cylindrical member. In other words, the shape of the reinforcement member 91 may be plate-like or cylindrical as long as it has elasticity, which will be described later.

The multiple openings 96a are formed at the one end side of the reinforcement member 91, and the screw 91a is inserted into one of these openings 96a. In this way, the reinforcement member 91 is secured to the frame 180. Further, multiple openings 96b are formed at the other end side of the reinforcement member 91, and the screw 91b is inserted into one of these openings 96b. In this way, the reinforcement member 91 is secured to the frame 181. L3 in FIG. 13A indicates the distance from the one secured end portion on the one end side of the reinforcement member 91 to the other secured end portion on the other end side of the reinforcement member 91. The distance L3 can be changed by changing the openings through which screws 91a and 91b are inserted among the multiple openings 96a and 96b formed in the reinforcement member 91. The length of the cable differs according to a user. Thus, the configuration is adopted which allows the length of the cable 90 to be changed according to user's needs.

Figure 13B:
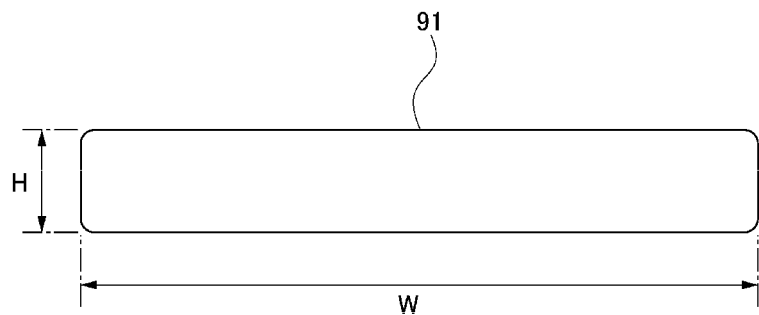

FIG. 13B is a drawing for describing the shape of the reinforcement member 91. The cross-section of the reinforcement member 91 is rectangular as shown in FIG. 13B. The cross-section of the reinforcement member 91 shown in FIG. 13B is the B-B cross-section shown in FIG. 13A, which is a widthwise cross-section orthogonal to the longitudinal direction of the reinforcement member 91. The reinforcement member 91 has the width W (=10 mm) in the widthwise direction, and the thickness H (=1.5 mm), and the (total) length L3 (=36 7.5 mm) in the longitudinal direction. The width W is larger than the thickness H.

Figure 14A:
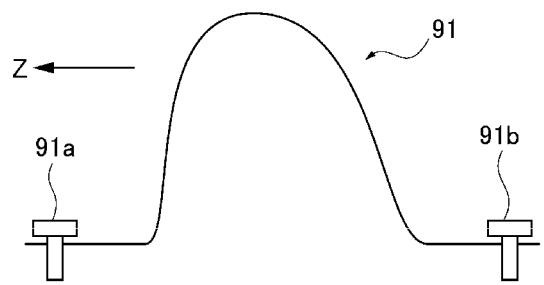
FIGS. 14A, 14B and 14C are diagrams for describing a method of measuring an elasticity of the reinforcement member.

FIG. 14A is a drawing for describing the state of the reinforcement member 91 when it is deflected. The deformation of the reinforcement member 91 generates a reaction force in the direction Z. The elasticity of the reinforcement member 91 reduces the possibility of the user deflecting or twisting the cable 90 more than necessary. This is because a user feel discomfort when the user deflects or twists the cable 90 due to the elasticity of the reinforcement member 91. This reduces the disconnection in the signal line 90a and the power line 90b.

Figure 14B:
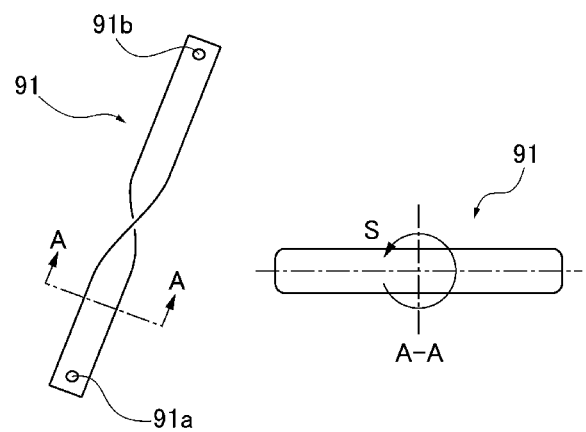

The method of measuring the elasticity of the reinforcement member 91 will be described next. A torque gauge (ATG3CN) manufactured by TOHNICHI MFG. CO., LTD was used as the measuring instrument. When measuring, the one end side of the reinforcement member 91 is secured to the jig first so that it does not move. In this state, the other end side of the reinforcement member 91 is secured to the torque gauge. The portion of the reinforcement member 91 secured to the torque gauge is located on an extension line passing through the portion of the reinforcement member 91 secured to the jig and along the longitudinal direction of the reinforcement member 91. In this state, while holding the torque gauge, the reinforcement member 91 is twisted as shown in FIG. 14B. Namely, the reinforcement member 91 is twisted in the direction of the arrow S in the A-A cross section of FIG. 14B. The value measured by this method is defined as the elasticity of the reinforcement member 91. In this embodiment, the elasticity of the reinforcement member 91 is about 4.6 cN·m. According to the inventor's experiments, when the elasticity of the reinforcement member 91 takes this value, a user feels discomfort when the cable 90 is twisted for three turns. According to the inventor's experiments, when the cable 90 is twisted for more than 5 turns, the possibility increases in which the signal line 90a or the power line 90b will be disconnected. By making a user feel discomfort at a stage prior to disconnection, it is possible to reduce the possibility of the user twisting the cable 90 more than necessary, causing the signal line 90a or power line 90b to break.

Figure 14C:
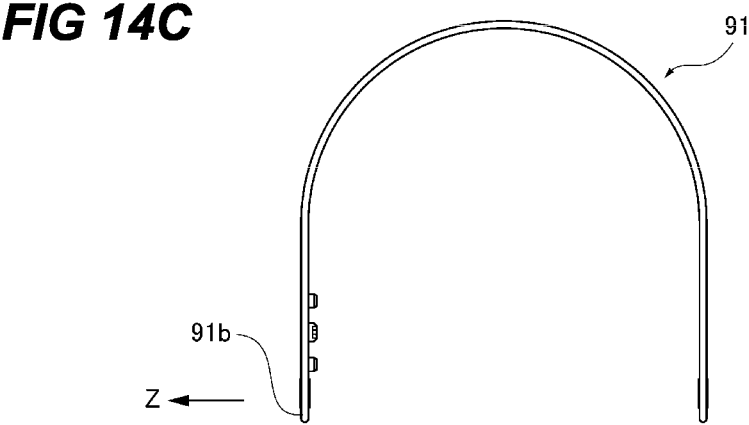

When the elasticity of the reinforcement member 91 measured by the method described above is 4.6 cN·m, the reaction force of the reinforcement member 91 is about 34 gf. The reaction force here is defined as the reaction force of the reinforcement member 91 when the surface of the one end side and the surface of the other end side of the reinforcement member 91 are brought closer together without twisting the reinforcement member 91 and these surfaces are brought into a parallel relationship in which these surfaces are opposed to each other as shown in FIG. 14C. According to the inventor's experiments, a user feels discomfort when the reaction force of the reinforcement member 91 exceeds 34 gf in deflecting the reinforcement member 91 in this manner. In this way, the user's movement to deflect the cable 90 more than necessary is reduced. As described above, if at least 4.6 cN·m of the elasticity of the reinforcement member 91 is secured, the disconnection of the wires in the cable 90 is reduced while ensuring the ease of movement of the operation unit 80.

The elasticity of the sheath 90c can also be measured and defined using the torque gauge. The measuring method is the same as that of measuring the elasticity of the reinforcement member 91 described above. The elasticity of the sheath 90c measured in this way is less than that of the reinforcement member 91. In comparing the elasticity of the two in the measuring, the total length of the reinforcement member 91 and the total length of the sheath 90c are to be the same.

Since the elasticity of the sheath 90c is less than that of the reinforcement member 91, the stiffness a user feels when the user bends the cable 90 is due to the reinforcement member 91. In other words, the sheath 90c has almost no effect on the stiffness of the cable 90.

(Cable Breakage Due to Localized Compression or Bending)

Figure 15A:
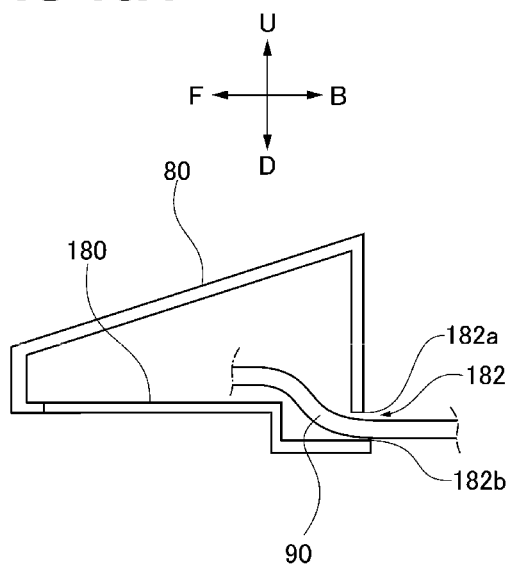
FIGS. 15A, 15B and 15C are diagrams for describing the outlet of the operation unit.
Figure 15B:
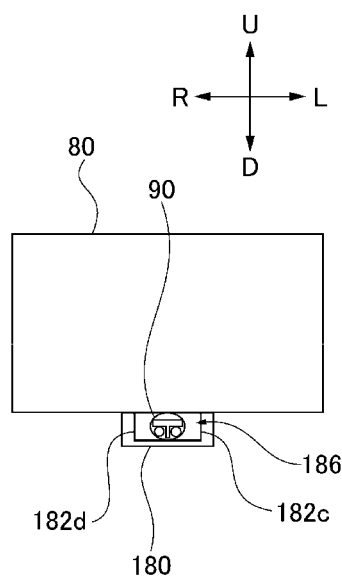
Figure 15C:
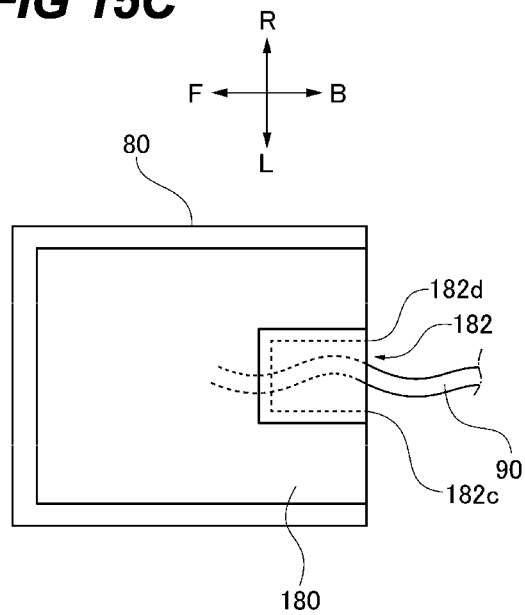

FIGS. 15A, 15B and 15C are drawings for describing the state of the cable 90 at the outlet 182 of the operation unit 80. FIG. 15A is a drawing of a cross-sectional view of the cable 90 when viewed from the right side of the outlet 182 of the operation unit 80. FIG. 15B is a drawing of a cross-sectional view of the cable 90 when viewed from the back side of the outlet 182 of the operation unit 80. FIG. 15C is a drawing of an external view of the operation unit 80 when viewed from the bottom side.

A user may wish to change the position, orientation, etc. of the operation unit 80 by moving the operation unit 80 depending on his or her height, standing position, etc. In this case, the reinforcement member 91 of the cable 90 deflects. If the stiffness of the reinforcement member 91 is higher, more force is required to deflect it and the operation unit 80 may require more operating force to change the position and orientation of the operation unit 80.

Therefore, as shown in FIG. 10, the cable 90 has multiple wires (the signal line 90a, the power line 90b) arranged horizontally (left-right directions) and the reinforcement member 91 has a rectangular cross-sectional shape. The width W of the reinforcement member 91 is wide in the horizontal (left-right) directions to match the width of the cable 90, but the height H in the vertical directions is smaller than the width W in the horizontal direction. In other words, the reinforcement member 91 is a plate-shaped member.

This configuration reduces the effect on the operation force by reducing the force with which the reinforcement member 91 bends vertically when the angle of the operation unit 80 is adjusted (changed) by operating the arm 822 as shown in FIGS. 8a and 8B. When moving the operation unit 80 in the left-right directions, somewhat more operating force is required to deflect the reinforcement member 91 than when moving the operation unit 80 in the vertical directions. However, since the operation unit 80 moves less frequently in the left-right directions, the reinforcement member 91 is configured to prioritize reducing the operation force when adjusting the angle of the operation unit 80.

Here, a consideration is given to a case where a wire sending a signal is operated with an operating force that exceeds the normal operating force. As the wire, a single video cable (HDMI (registered trademark) cable), which is the signal line 90a of the cable 90, was used. An experiment was conducted in which the video cable was repeatedly abutted against the end portion forming the outlet. An operating force (50 N) that slightly exceeds the normal operating force was used as the force to abut the aforementioned video cable against the end portion that forms the outlet. According to the experiment conducted by the inventor, when the video cable was repeatedly abutted against the end portion forming the outlet about 100 to 200 times with a force of 50 N, the sheath on the surface of the cable and the wires inside were damaged.

Further, when the video cable is bent 90 degrees from the end portion forming the outlet, the video cable itself has a radius of about 10 mm. When the bending of the video cable by which the radius of the video cable itself becomes less than or equal to 20 mm was repeated about 100 to 200 times, the sheath and the wire were damaged since the sheath and the inside wire of the video cable were repeatedly locally compressed and pulled in the longitudinal directions.

<Condition of Cable when Operation Unit is Moved>

FIGS. 16A, 16B, 16C, and 16D are drawings for describing the states in which when the operation unit 80 shown in FIG. 15 is moved, the cable 90 is compressed and bent by being abutted against the upper end portion 182a, the lower end portion 182b, the left end portion 182c and the right end portion 182d.

Figure 16A:
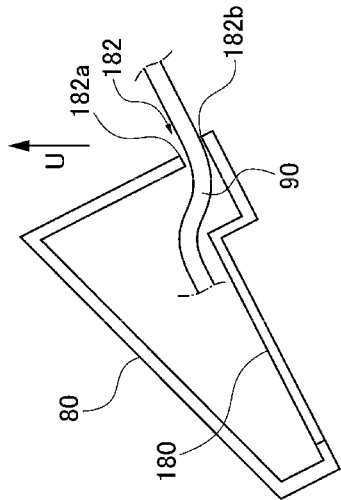
FIGS. 16A, 16B, 16C and 16D are diagrams for describing the behavior of the cable at the outlet when the operation unit is moved.
Figure 16B:
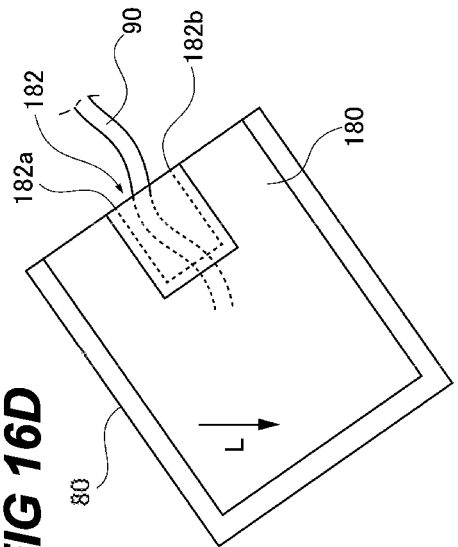

When the front side of the operation unit 80 is moved in the direction of arrow U as shown in FIG. 16A, the cable 90 is abutted against the upper end portion 182a of the outlet 182 of the frame 180, and the cable 90 is bent from the upper end portion 182a. When the back side of the operation unit 80 is lifted in the direction of arrow U as shown in FIG. 16B, the cable 90 is abutted against the lower end portion 182b of the outlet 182 of the frame 180, and the cable 90 is bent from the lower end portion 182b. In other words, when the operation unit 80 shown in FIG. 16A or FIG. 16B is moved, the cable 90 is abutted against the upper end portion 182a or the lower end portion 182b and is locally compressed at these portions, which produces a bending force around these portions.

Figure 16C:
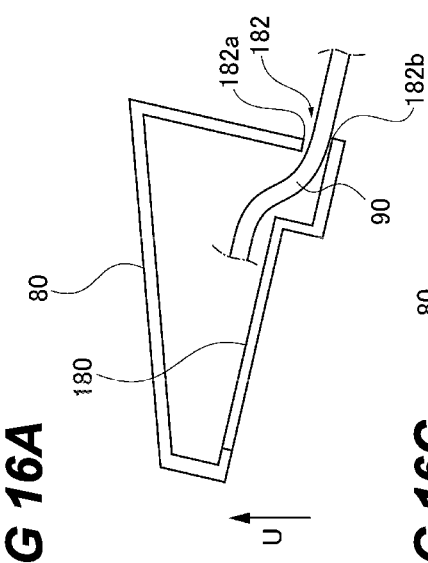
Figure 16D:
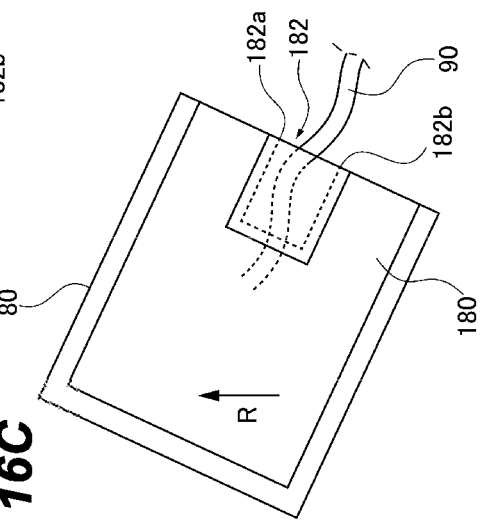

When the front side of the operation unit 80 is moved in the direction of the arrow R as shown in FIG. 16C, the cable 90 is abutted against the right end portion 182d of the outlet 182 of the frame 180, and the cable 90 is bent from the right end portion 182d. When the front side of the operation unit 80 is moved in the direction of the arrow L as shown in FIG. 16D, the cable 90 is abutted against the left end portion 182c of the outlet 182 of the frame 180, and the cable 90 is bent from the left end portion 182c. In other words, when the operation unit 80 shown in FIG. 16C or FIG. 16D is moved, the cable 90 is abutted against the right end portion 182d or the left end portion 182c and is locally compressed at these portions, which produces a bending force around these portions.

<Cable Configuration at Outlet of the Operation Unit>

Figure 17A:
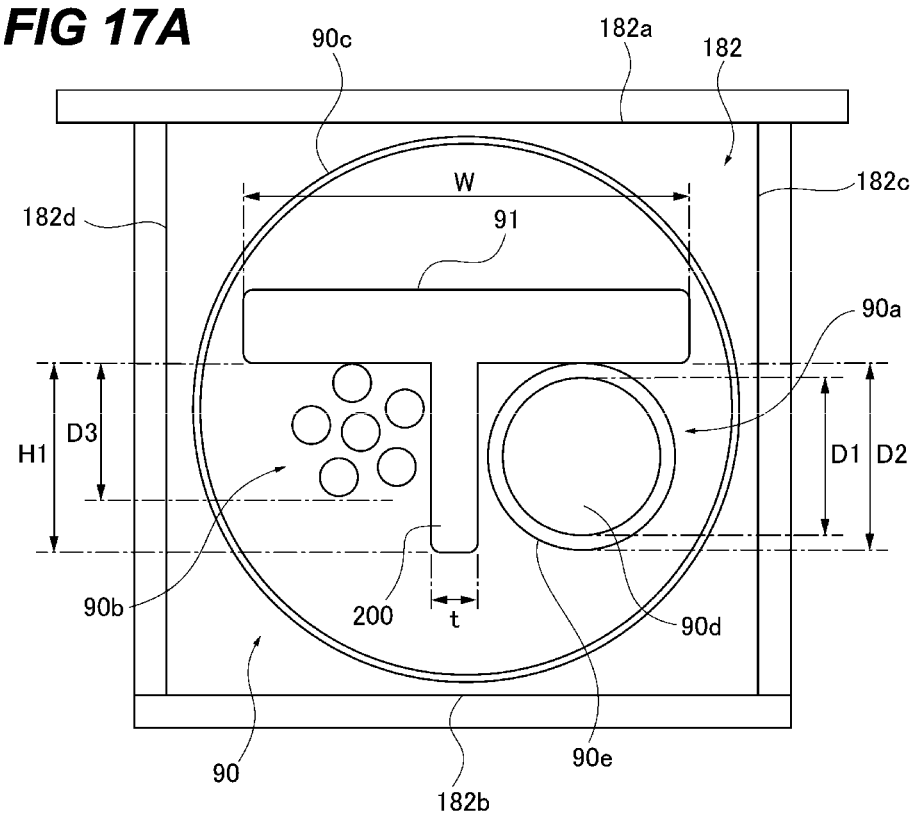
FIGS. 17A and 17B are diagrams for describing the configuration of the cable near the outlet in the first embodiment.
Figure 17B:
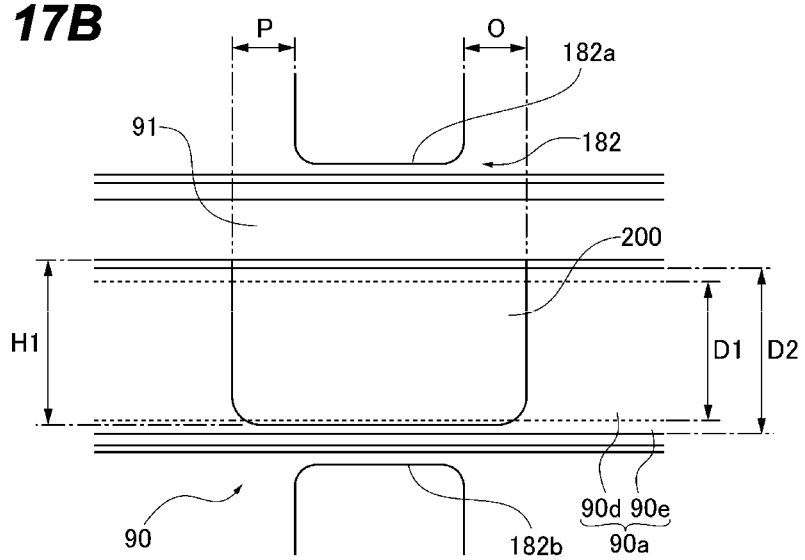

The detailed configuration of the cable 90 in this embodiment will be described using FIGS. 17A and 17B. FIGS. 17A and 17B show cross-sectional views at the outlet 182 of the cable 90 shown in FIG. 10. FIG. 17A is the X-X cross-sectional view shown in FIG. 15A and FIG. 17B is the Y-Y cross-sectional view shown in FIG. 15B. FIG. 10 is the Z-Z cross-sectional view shown in FIG. 11A, which is a cross-sectional view of the cable 90 near the center portion of the cable 90 in the longitudinal direction between the outlet 182 of the operation unit and the outlet 183 of the image forming apparatus.

Here, in addition to the configuration of the cable 90 shown in FIG. 10, the protruding portion 200 protruding from the side of the reinforcement member 91 on which the signal line 90a and the power line 90b are arranged is provided. That is, the cable 90 of the present embodiment has the reinforcement member 91 and the protruding portion 200 that protrudes from the side of the reinforcement member 91 on which the signal line 90a and the power line 90b are arranged.

The reinforcement member 91 is provided along the signal line 90a and the power line 90b from the frame 181 of the image forming apparatus 2 to the frame 180 of the operation unit 80 (see FIG. 11A). The reinforcement member 91 has the width W equal to or greater than the lengths D2 and D3 of the diameters of the signal line 90a and the power line 90b in the horizontal directions (first directions, left-right directions). The reinforcement member 91 is an elastic member having elasticity.

As described above, the protruding portion 200 is provided so as to protrude from the side of the reinforcement member 91 on which the signal line 90a and the power line 90b are arranged. The protruding portion 200 is provided along the signal line 90a and the power line 90b from the inside to the outside of the operation unit 80 through the outlet 182. The protruding portion 200 has the height H1 in the vertical directions (second directions, upward and downward directions) that intersects the horizontal directions. The height H1 is equal to or greater than the diameter D2 of the signal line 90a and the diameter D3 of the power line 90b. The protruding portion 200 is an elastic member having elasticity. In this embodiment, the protruding portion 200 is formed integrally with the reinforcement member 91.

The cable 90 also has the sheath 90c as described above. The sheath 90c encapsulates the signal line 90a, the power line 90b, the reinforcement member 91, and the protruding portion 200 from the inside to the outside of the operation unit 80 via the outlet 182.

As described above, the cable 90 has the signal line 90a and the power line 90b as wires for sending electric signals between the image forming apparatus 2 and the operation unit 80. The signal line (video cable) 90a connects the image controller 710 of the image forming apparatus 2 to the driver board 81 of the operation unit 80. The power line (power cable) 90b connects the power supply 17 of the image forming apparatus 2 to the driver board 81 of the operation unit 80.

The reinforcement member 91 spans the signal line 90a and the power line 90b in the horizontal directions. Moreover, the protruding portion 200 is provided between the signal line 90a and the power line 90b in the horizontal directions.

The reinforcement member 91 has the width W equal to or greater than the total sum of the diameter D2 of the signal line 90a, the diameter D3 of the power line 90b, and the width t of the protruding portion 200 in the widthwise directions (left and right directions). The protruding portion 200 is provided between the signal line 90a and the power line 90b. The above widthwise directions are perpendicular to the longitudinal direction (forward and backward directions) extending from the inside to the outside of the operation unit 80 through the outlet 182.

As described above, the protruding portion 200 has the height H1 in the vertical directions (the second directions, the upward and downward directions) that intersects the horizontal directions. The height H1 is equal to or greater than the diameter D2 of the signal line 90a and the diameter D3 of the power line 90b.

<When Cable Abuts on Upper End Portion>

When the cable 90 abuts on the upper end portion 182a of the outlet 182, the reinforcement member 91 of the cable 90 faces the upper end portion 182a of the outlet 182. Therefore, the reinforcement member 91 receives the abutting force when the cable 90 abuts on the upper end portion 182a of the outlet 182. The reinforcement member 91 is an elastic member made of plastic or the like having a predetermined thickness. Therefore, although it elastically deflects, it does not locally bend. Namely, the reinforcement member 91 is configured to disperse the abutting force since the bending radius of the reinforcement member 91 is large.

With this configuration, the signal line 90a and the power line 90b encased in the cable 90 do not directly abut on the upper end portion 182a of the outlet 182. As a result, the sheath 90c of the cable 90 is not damaged due to rubbing. Further, since the bending radius of the cable 90 is large with the use of the reinforcement member 91, the bending force acting on the signal line 90a and the power line 90b is dispersed and the force does not act locally.

Furthermore, in this embodiment, the above-described protruding portion 200 is provided in addition to the reinforcement member 91. Therefore, even if the operating force (for example, 50 N) with which the cable 90 abuts on the upper end portion 182a of the outlet 182 exceeds the normal operating force, the compressing force locally acting on the signal line 90a and the power line 90b is minute. In addition, the rigidity of the reinforcement member 91 near the upper end portion is increased by the protruding portion. As a result, the bending radius of about 40 mm of the cable 90, which is equal to or greater than 20 mm, can be secured, thereby preventing breakage of the cable due to repeated bending.

<When Cable Abuts on Lower End Portion>

The position of the protruding portion 200 in the widthwise directions of the reinforcement member 91 will be described using FIG. 17A. The widthwise directions of the reinforcement member 91 are the directions (left and right directions) orthogonal to the longitudinal directions (forward and backward directions) in which the reinforcement member 91 runs from the inside to the outside of the operation unit 80 via the outlet 182.

As shown in FIG. 17A, the height H1 of the protruding portion 200 is approximately set to be equal to or greater than the diameter D2 of the signal line 90a and the diameter D3 of the power line 90b (H1≥D2 and H1≥D3). With this configuration, in a case where the cable 90 abuts on the lower end portion 182b of the outlet 182, the protruding portion 200 abuts on the lower end portion 182b before the signal line 90a and the power line 90b do so. Therefore, the reinforcement member 91 receives the abutting force with which the cable 90 abuts on the lower end portion 182b of the outlet 182 via the protruding portion 200. As a result, the signal line 90a and the power line 90b in the cable 90 do not abut on the lower end portion 182b of the outlet 182, so that the sheath 90c of the cable 90 is not damaged by rubbing. Further, the bending radius can be increased by the reinforcement member 91, so that the force does not act locally on the signal line 90a and the power line 90b.

In this embodiment, the thickness H of the reinforcement member 91 is set to 1.5 mm, and the width t of the protruding portion 200 is set 1 mm. These are the dimensions with which the protruding portion 200 is not deformed by the operating force applied by an operator. The protruding portion 200 is provided in the center of the reinforcement member 91 in the directions of the width W (left and right directions). As a result, the abutting force with which the cable 90 abuts on the lower end portion 182b of the outlet 182 is received at the center of the reinforcement member 91.

With this configuration, the locally compressing force applied to the signal line 90a and power line 90b is minute even when an operator operates the cable 90 with operating force of about 50 N. Since the rigidity of the reinforcement member 91 is increased near the lower end portion, the bending radius of the cable 90 can also be secured at about 40 mm, which is a radius of 20 mm or more, thereby preventing breakage of the cable due to repeated bending.

Next, the relationship between the protruding portion 200 and the diameter D2 of the signal line 90a, and the diameter D3 of the power line 90b will be described. It is preferable that the height H1 of the protruding portion 200 should be higher than the diameter D2 of the signal line 90a and the diameter D3 of the power line 90b in order that the protruding portion 200 abuts on the lower end portion 182b before the signal line 90a and the power line 90b do so. However, if the height H1 of the protruding portion 200 is increased, the rigidity of the reinforcement member 91 may be increased too much, making the reinforcement member 91 hard to deflect when the operation unit 80 is moved, which may affect the operability of the operation unit 80. Therefore, from the viewpoint of operability, it is necessary to keep the height H1 of the protruding portion 200 low enough to the extent that operability is not affected.

In this embodiment, the height H1 of the protruding portion 200 is 4.5 mm and the diameter D2 of the signal line 90a is ø 4.8 mm. The signal line 90a is composed of the electric wire 90d and the sheath 90e. The diameter D2 of the signal line 90a is equal to the sum of the diameter D1 of the wire 90d (ø 3.8 mm) and the thickness of the rubber sheath 90e (0.5 mm). The diameter of the power line 90b is about ø 3 mm (Detailed dimensions of wires and sheaths are omitted). The diameter of the signal line 90a is larger than that of the power line 90b. Therefore, when the operation unit is moved, the signal line 90a will abut on the lower end portion 182b without the protruding portion 200, so that a bending and compressing force acts on the signal line 90a. The height H1 of the protruding portion is 4.5 mm, which is set lower than the diameter D2 of the signal line 90a of ø 4.8 mm. However, since the sheath 90e is a rubber-like member and has elasticity, the sheath 90e is elastically deformed when it abuts on the lower end portion 182b, and the protruding portion 200 abuts on the lower end portion 182b. Therefore, even if the protruding portion 200 is slightly lower than the signal line 90a, the force of abutting on the lower end portion 182b is received by the protruding portion 200 and is further received by the reinforcement member 91 via the protruding portion 200.

Next, the minimum height of the protruding portion 200 will described. The sheath 90e of the signal line 90a is generally 0.5 mm thick (1 mm in diameter). With a typical rubber-based material, about 40% of the thickness, or 0.2 mm (about 0.4 mm in diameter), is deformed by soft forces. Therefore, even if the height H1 of the protruding portion 200 is about 0.4 mm (twice 0.2 mm) lower than the diameter D2 of the signal line 90a, a force to break the wire 90d inside the sheath will not act. Therefore, the minimum height of the protruding portion 200 is set to be about 40% (0.4 mm if the thickness of the sheath is 0.5 mm) lower than the diameter of the encased electric wire (cable).

Next, the position of the protruding portion 200 relative to the longitudinal directions of the reinforcement member 91 will be described using FIG. 17B.

The protruding portion 200 is arranged at a position straddling the outlet 182 from the inside to the outside of the operation unit 80 in the longitudinal directions of the reinforcement member 91. In this embodiment, the protruding portion 200 is provided straddling the outlet 182 such that the length O and the length P are 5 mm each in the longitudinal directions of the reinforcement member 91. The length O is the distance between one end edge of the lower end portion 182b that is outside the outlet 182 of the operation unit 80 and one end portion of the protruding portion 200. The length P is the distance between the other end edge of the lower end portion 182b that is inside the outlet 182 of the operation unit 80 and the other end portion of the protruding portion 200.

When an operator moves the operation unit 80, the operator deflects the reinforcement member 91 as shown in FIG. 14A. If the thickness H of the reinforcement member 91 is about 1.5 mm, it can be moved with little discomfort. However, as the thickness of the reinforcement member 91 increases, a greater force is required to deflect the reinforcement member 91, thereby giving the operator a feeling of discomfort. In other words, as the length O of the portion of the protruding portion 200 stuck outwardly from the operation unit 80 becomes larger, the reinforcement member 91 becomes more rigid, causing discomfort in the operation of deflecting the reinforcement member 91. In this regard, it is preferable that the longitudinal length of the protruding portion 200 should be short. In this embodiment, the length O and the length P of the protruding portion 200 are set to 5 mm respectively. These lengths are set such that the protruding portion 200 may be in contact with the lower end portion 182b even when the reinforcement member 91 moves in the inward direction of the operation unit 80 by operation. When the protruding portion 200 has the length O of about 5 mm and the height H1 described above, it will prevent the breakage of the cable 90 without causing discomfort when an operator deflects the reinforcement member 91 in the direction indicated by the arrow U.

<When Cable Abuts on Right and Left End Portions>

As shown in FIG. 17A, the sum of the respective widths of the protruding portion 200, the signal line 90a, and the power line 90b which are arranged in the direction of the width W of the reinforcement member 91 is configured to be less than the width W of the reinforcement member 91. With this configuration, the signal line 90a and the power line 90b do not stick from the left and right end portions of reinforcement member 91.

In this embodiment, the width t of the protruding portion 200 is set to 1 mm, the diameter of the signal line 90a is set to 4.8 mm, and the diameter of the power line 90b is set to 3 mm, so that the sum of the lengths of these parts is 8.8 mm. In view of this, the width w of the reinforcement member 91 is set to be less than 10 mm. With this configuration, when the signal line 90a, the protruding portion, and the power line 90b are arranged in the direction of the width W of the reinforcement member 91, they do not stick beyond the right and left end portions of the reinforcement member 91.

FIG. 17A is used to illustrate a case where the cable 90 abuts on the right end portion 182d or the left end portion 182c of the outlet 182.

As shown in FIG. 17A, the signal line 90a and the power line 90b are located on the inner sides of the left and right end portions 182c and 182d of the reinforcement member 91. Therefore, when the cable 90 is moved left and right, the reinforcement member 91 abuts on the right end portion 182d or the left end portion 182c before the signal line 90a and the power line 90b should do so. As a result, the signal line 90a and the power line 90b encased in the cable 90 do not directly abut on the right and left end portions of the outlet 182, so that the sheath is not damaged by rubbing. In addition, the bending radius of the cable 90 can be increased by the reinforcement member 91, so that the bending force acting on the signal line 90a and the power line 90b is dispersed, and the force does not act locally.

As described above, according to this embodiment, the space for the signal line 90a and the power line 90b is secured inside the cable 90 by the reinforcement member 91 and the protruding portion 200. Therefore, when the operation unit 80 is moved, the cable 90 will not directly abut on the upper, lower, left, and right end portions 182a to 182d of the outlets 182, even if the cable 90 abuts on the upper, lower, left, and right end portions 182a to 182d. As a result, the cable 90 is free from breakage of the sheath due to rubbing. Further, the bending radius of the cable 90 can be increased by the reinforcement member 91 and the protruding portion 200. As a result, the bending force acting on the signal line 90a and the power line 90b is dispersed, and the force does not act locally, thereby preventing damage of the sheath of the cable 90 and breakage of the internal wires.

In addition, since the protruding portion 200 is provided only near the outlet 182 and is not provided in other locations, the reinforcement member 91 is elastically bent and the rigidity of the cable 90 is not increased much. Therefore, when a user moves the operation unit 80, the cable 90 can be easily bent.

This configuration prevents damage or breakage of the sheath and wires of the cable without worsening the operability when moving the operation unit due to increased rigidity of the cable.

Second Embodiment

Figure 18A:
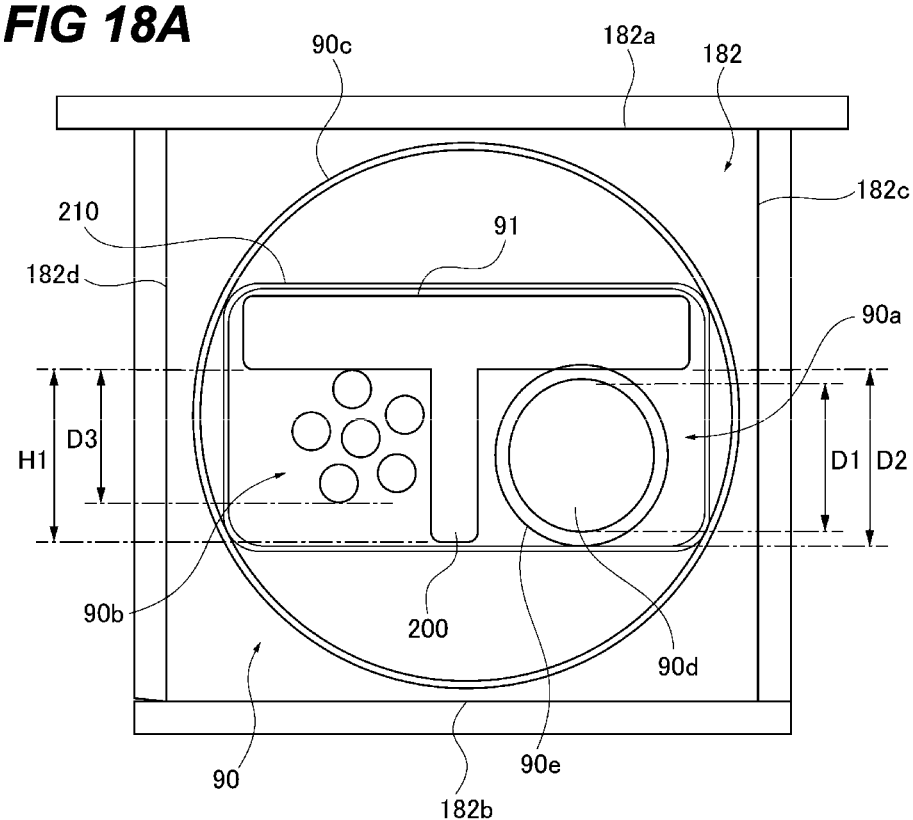
FIGS. 18A and 18B are diagrams for describing the configuration of the cable near the outlet in the second embodiment.
Figure 18B:
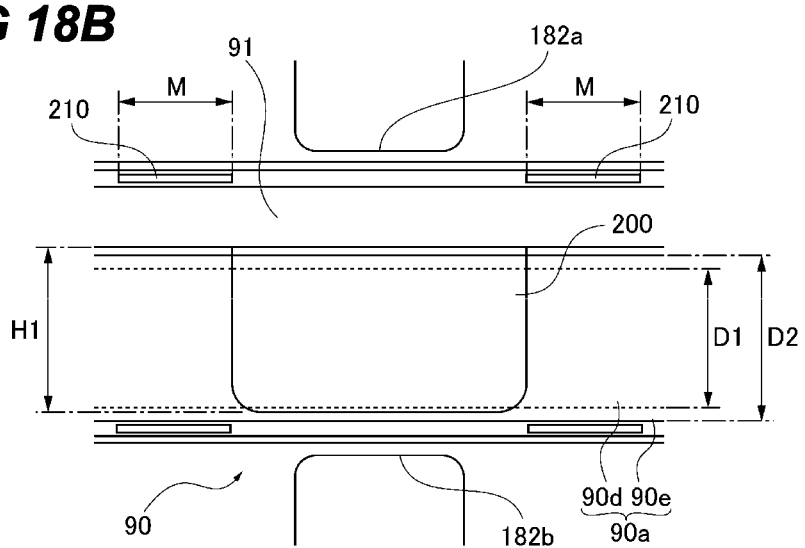

Next, the detailed configuration of the cable 90 of the second embodiment will be described using FIGS. 18A and 18B. FIGS. 18A and 18B show cross-sectional views at the outlet 182 of the cable 90 shown in FIG. 10. FIG. 18A is the X-X cross-sectional view shown in FIG. 15A and FIG. 18B is the Y-Y cross-sectional view shown in FIG. 15B. The configurations of the components other than the cable 90 shown in FIGS. 18A and 18B are the same as those of the first embodiment. Therefore, the components with equivalent functions are marked with the same symbol and detailed descriptions thereof are omitted.

The cable 90 of the second embodiment includes the elastic sheet 210 as a regulating member that regulates the positions of the signal line 90a and the power line 90b with respect to the reinforcement member 91. An adhesive layer is provided on one side of the elastic sheet 210. The elastic sheet 210 is a commonly used vinyl tape and has an elastic member with a commonly used width M of 17 mm and a thickness of about 0.1 mm. The adhesive layer is provided on one side of the elastic member of the elastic sheet 210.

The elastic sheet 210 is provided inside and outside the operation unit 80 via the outlet 182, adjacent to the upstream and downstream ends of the protruding portion 200 in the forward and backward directions. In other words, in this embodiment, the elastic sheet 210 is provided at the two locations, a location in front of the protruding portion 200 and a location behind the protruding portion 200. The elastic sheet 210 is wound around the signal line 90a, the power line 90b, and reinforcement member 91 with the adhesive layer inside for a length of one round or more, so that the adhesive layer sticks to the signal line 90*a*, the power line 90*b*, and the reinforcement member 91. As a result, the signal line 90*a* and the power line 90*b* are fixed to the reinforcement member 91. In this way, in the cable 90, the positions of the signal line 90*a* and the power line 90*b* are thus restricted with respect to the reinforcement member 91 at the adjacent positions in front of and behind the protruding portion 200.

As shown in FIG. 18B, at the positions in the reinforcement member 91 where the elastic sheets 210 are provided adjacent to the protruding portion 200, the protruding portion 200 is not provided, Therefore, by winding the elastic sheet 210 at these positions, the signal line 90*a* and the power line 90*b* are fixed to the reinforcement member 91, and the positions of the signal line 90*a* and the power line 90*b* are restricted with respect to the reinforcement member 91.

When a user moves the operation unit, the signal line 90*a* and power line 90*b* may receive a force due to the deflected reinforcement member 91. In this case, the signal line 90*a* and power line 90*b* may stick out from the end portions in the directions of width W or beyond the height H1 of the protruding portion 200. When the cable 90 is moved, if the signal line 90*a* and the power line 90*b* abut on or are pinched by the end portion of the outlet 182 before the reinforcement member 91 or the protruding portion 200 abuts on the end portion of the outlet 182, there is a risk that the sheath may be damaged or the wires may break due to abutting or being pinched. In this embodiment, the elastic sheets 210 restrict the positions of the signal line 90*a* and the power line 90*b* with respect to the reinforcement member 91 in front of and behind the protruding portion 200. Therefore, the signal line 90*a* and the power line 90*b* do not stick out beyond the width W of the reinforcement member 91 or the end portions of the protruding portion 200 near the outlet 182. As a result, the damage of the sheaths of the signal line 90*a* and the power line 90*b* and breakage of the wires of the signal line 90*a* and the power line 90*b* can be prevented.

Since the elastic sheets 210 are made of an elastic member as described above and is thin, it does not cause discomfort when a user deflects the reinforcement member 91, so that the operability is not affected.

With the above configuration, the positions of the signal line 90*a* and the power line 90*b* encased in the cable 90 are restricted with respect to the reinforcement member 91 without causing discomfort for an operating force when a user moves the operation unit. In addition, when the cable 90 abuts on the end portions of the outlet, the load can be reduced, so that the damage to the sheath and wires can be stably prevented.

In this embodiment, the configuration is illustrated that the elastic sheet 210 is provided inside and outside the operation unit 80 via the outlet 182, adjacent to the upstream and downstream ends of the protruding portion 200 in the forward and backward directions. However, the invention is not limited to this configuration. It is also effective to provide the elastic sheet 210 at a single position adjacent to one of the upstream and the downstream end portions of the protruding portion 200 in the forward and backward directions. However, it is more effective to provide the elastic sheet 210 in both positions adjacent to the upstream and downstream end portions of the protruding portion 200 in the forward and backward directions.

Although a tape is used as the elastic sheet 210 in this embodiment, the same effect can be obtained by attaching a double-sided adhesive tape to a thin sheet to form a tape.

Other Embodiments

In the first embodiment, the configuration in which the protruding portion 200 is provided at a single position in the center of the reinforcement member 91 in the width directions is exemplified since the signal line 90*a* and the power line 90*b* are encased in the cable 90. The present invention is not limited to this configuration. When the number of electric wires encased in the cable 90 increases, the protruding portion 200 may be provided at multiple locations in the width directions.

Figure 19:
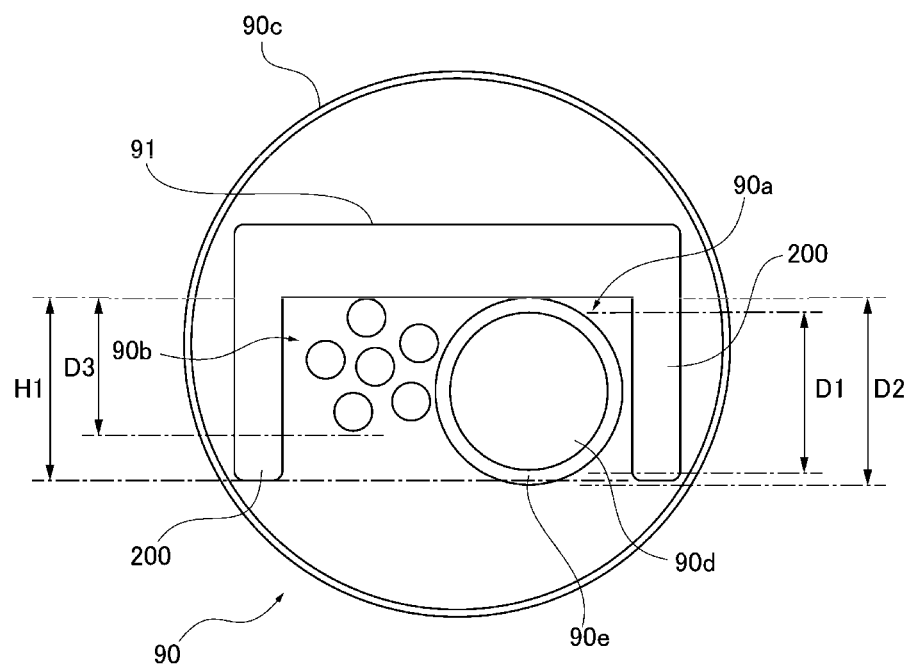
FIG. 19 is a diagram showing another configuration of the cable near the outlet.

Moreover, as shown in FIG. 19, the protruding portion 200 may be provided on both sides (left and right end portions) of the reinforcement member 91 in the width directions. In this case, since the rigidity of the reinforcement member 91 is increased when it deflects in the vertical directions, there is a possibility that an operating force for moving the operation unit in those directions will increase. In the configuration in which the protruding portion 200 is provided on both sides of the reinforcement member 91 in the width directions, even if an external force is applied to the signal line 90*a* and the power line 90*b*, these lines do not stick out from the end portions of the reinforcement member 91 in the width directions because of the presence of the protruding portions at the end portions of the reinforcement member 91. Therefore, this configuration has the advantage that the signal line 90*a* and the power line 90*b* abut on the left and right end portions. Here, the width directions of the reinforcement member 91 refer to the widthwise directions orthogonal to the longitudinal directions from the inside to the outside of the operation unit 80 through the outlet 182.

In the first embodiment, the configuration in which the wires (signal line 90*a*, power line 90*b*) in the cable 90 are provided on one side of the reinforcement member 91 is illustrated. This configuration is adopted to reduce the thickness of the reinforcement member 91 and to suppress an increase in vertical stiffness of the reinforcement member 91 by providing the protruding portion 200 only on one side of the reinforcement member 91. However, the invention is not limited to this configuration. If an increase in vertical stiffness of the reinforcement member 91 is allowed, the wires of the cable 90 can be provided on both sides of the reinforcement member 91 and the protruding portion 200 can be provided on both sides of the reinforcement member 91. This configuration also has the same effect of preventing damage or breakage of the cable 90.

Even when the protruding portions 200 are provided on both sides of the reinforcement member 91, the protruding portions 200 are located near the outlet 182. This means that there are no protruding portions in other locations and the reinforcement member 91 deflects elastically. As a result, it is possible to maintain a low rigidity of the electric cable and a user can easily move the operation unit.

In the first and the second embodiments, the configurations of the cable 90 in the vicinity of the outlet 182 on the operation unit 80 are described. However, a similar configuration can be adopted for the cable 90 in the vicinity of the outlet 183 on the image forming apparatus 2 to achieve a similar effect.

In the above embodiments, the protruding portion 200 is provided only at a position which straddles the outlet 182 on the reinforcement member 91 in order to minimize a rigidity increase of the cable 90. However, the invention is not limited to this configuration. For example, if an increase in rigidity has a little effect on the operability when the height of the cable 90 is less, the protruding portion 200 may be additionally provided at other positions or the protruding portion 200 may be configured to extend along the entire length of the cable 90. In this case, even when the cable 90 is pinched not only near the outlet 182, but also in other locations, the damage or breakage of the wires can be prevented by the protruding portion 200.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-195902, filed Dec. 2, 2021, which is hereby incorporated by reference herein in its entirety.

What is claimed is:

1. An image forming apparatus comprising:
a frame on which an image forming portion which forms an image on a sheet is provided;
an operation unit which receives an operation and which has a display panel which displays information, the operation unit being provided separately from the frame, the operation unit being arranged to be movable with respect to a top surface of the frame;
a cable with an electric wire which connects the frame and the operation unit to send an electric signal between the frame and the operation unit; and
an outlet provided on the frame or the operation unit, the cable leading from an inside to an outside through the outlet,
wherein the cable includes:
an elastic member with elasticity provided along the electric wire from the frame to the operation unit, the elastic member having a width, in a first direction, which is equal to or greater than a diameter of the electric wire; and
a protruding portion with elasticity, provided on a side of the elastic member on which the electric wire is arranged such that the protruding portion protrudes from the side of the elastic member, the protruding portion being provided along the electric wire from the inside to the outside through the outlet, the protruding portion having a height, in a second direction crossing the first direction, which is equal to or greater than the diameter of the electric wire.

2. The image forming apparatus according to claim 1, wherein the cable comprises a sheath which encases the electric wire, the elastic member and the protruding portion from the inside to the outside through the outlet.

3. The image forming apparatus according to claim 1, wherein a restricting member is provided at a position adjacent to the protruding portion on the inside or the outside of the outlet, the restricting member being configured to restrict a position of the electric wire with respect to the elastic member.

4. The image forming apparatus according to claim 3, wherein the restricting member comprises an elastic sheet having an adhesive layer on a surface of the elastic sheet, and
wherein the elastic sheet is wound for one round or more with the surface being inside such that the electric wire is fixed to the elastic member.

5. The image forming apparatus according to claim 1, wherein the cable includes a signal line as the electric wire which connects a control portion of the image forming apparatus with the operation unit, and a power line as the electric wire which connects a power supply of the image forming apparatus with the operation unit.

6. The image forming apparatus according to claim 5, wherein the elastic member is provided across the signal line and the power line, and the protruding portion is provided between the signal line and the power line.

7. The image forming apparatus according to claim 6, wherein the elastic member has a width in a widthwise direction orthogonal to a longitudinal direction which extends from the inside to the outside through the outlet, the width being equal to or greater than a sum of a dimeter of the signal line, a diameter of the power line, and a width of the protruding portion provided between the signal line and the power line, and
wherein the height of the protruding portion is equal to or greater than the diameter of the signal line and the diameter of the power line.

8. The image forming apparatus according to claim 1, wherein the protruding portion is provided on both sides of the elastic member in a widthwise direction orthogonal to a longitudinal direction which extends from the inside to the outside through the outlet.

9. The image forming apparatus according to claim 1, wherein the elastic member is a plate-like member.

10. An image forming apparatus comprising:
a frame on which an image forming portion which forms an image on a sheet is provided;
an operation unit which receives an operation and which has a display panel which displays information, the operation unit being provided separately from the frame, the operation unit being arranged to be movable with respect to a top surface of the frame;
a cable with an electric wire which connects the frame and the operation unit to send an electric signal between the frame and the operation unit; and
an outlet provided on the frame or the operation unit, the cable leading from an inside to an outside through the outlet,
wherein the cable includes:
an elastic member with elasticity provided along the electric wire from the frame to the operation unit, the elastic member having a width, in a first direction, which is equal to or greater than a diameter of the electric wire; and
a protruding portion with elasticity, provided on a side of the elastic member on which the electric wire is arranged such that the protruding portion protrudes from the side of the elastic member, the protruding portion being provided along the electric wire from the inside to the outside through the outlet.

11. The image forming apparatus according to claim 10, wherein the electric wire comprises a core line for transferring the electric signal and a sheath which contains the core line, and
the protruding portion has a height, in a second direction perpendicular to the first direction, greater than a diameter of the core line, and
the height of the protruding portion in the second direction is smaller than a diameter of the sheath.

12. The image forming apparatus according to claim 10, wherein the electric wire comprises a core line for transferring the electric signal and a sheath which contains the core line, and
the protruding portion has a height, in a second direction perpendicular to the first direction, greater than a diameter of the sheath.

13. The image forming apparatus according to claim 10, wherein the cable further comprises a sheath which encases the electric wire, the elastic member, and the protruding portion from the inside to the outside through the outlet.

14. The image forming apparatus according to claim 10, wherein a restricting member is provided at a position adjacent to the protruding portion on the inside or the outside of the outlet, the restricting member being configured to restrict a position of the electric wire with respect to the elastic member.

15. The image forming apparatus according to claim 14, wherein the restricting member comprises an elastic sheet having an adhesive layer on a surface of the elastic sheet, and
wherein the elastic sheet is wound for one round or more with the surface being inside such that the electric wire is fixed to the elastic member.

16. The image forming apparatus according to claim 10, wherein the cable includes a signal line as the electric wire which connects a control portion of the image forming apparatus with the operation unit, and a power line as the electric wire which connects a power supply of the image forming apparatus with the operation unit.

17. The image forming apparatus according to claim 16, wherein the elastic member is provided across the signal line and the power line, and the protruding portion is provided between the signal line and the power line.

18. The image forming apparatus according to claim 17, wherein the elastic member has a width in a widthwise direction orthogonal to a longitudinal direction which extends from the inside to the outside through the outlet, the width being equal to or greater than a sum of a dimeter of the signal line, a diameter of the power line, and a width of the protruding portion provided between the signal line and the power line, and
wherein a height of the protruding portion, in a second direction perpendicular to the first direction, is equal to or greater than the diameter of the signal line and the diameter of the power line.

19. The image forming apparatus according to claim 10, wherein the protruding portion is provided on both sides of the elastic member in a widthwise direction orthogonal to a longitudinal direction which extends from the inside to the outside through the outlet.

20. The image forming apparatus according to claim 10, wherein the elastic member is a plate-like member.

\* \* \* \* \*